(12) United States Patent
Maxwell et al.

(10) Patent No.: US 8,976,940 B2
(45) Date of Patent: *Mar. 10, 2015

(54) SYSTEMS AND RELATED METHODS FOR VISUAL INDICATION OF AN OCCURRENCE OF AN EVENT

(71) Applicant: Sorenson Communications, Inc., Salt Lake City, UT (US)

(72) Inventors: Conrad Arlo Maxwell, Herriman, UT (US); Eric Winsor, West Jordan, UT (US); Lane Walters, American Fork, UT (US); Phillip Shimek, Bear River City, UT (US); Miranda Johnson, Salt Lake City, UT (US); Mark Nelson, Salt Lake City, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/092,600

(22) Filed: Nov. 27, 2013

(65) Prior Publication Data

US 2014/0270101 A1 Sep. 18, 2014

Related U.S. Application Data

(63) Continuation-in-part of application No. 13/795,105, filed on Mar. 12, 2013, now Pat. No. 8,824,640.

(51) Int. Cl.
*H04M 11/00* (2006.01)
*H04M 3/02* (2006.01)
(Continued)

(52) U.S. Cl.
CPC ................ *H04M 3/02* (2013.01); *H04M 1/576* (2013.01); *H04M 3/04* (2013.01); *H04M 3/42391* (2013.01); *H04M 19/048* (2013.01); *H04M 1/7253* (2013.01); *H04M 2201/38* (2013.01)
USPC ........................................ 379/52; 379/376.01

(58) Field of Classification Search
USPC ................................................ 379/52, 376.01
See application file for complete search history.

(56) References Cited

U.S. PATENT DOCUMENTS 5,946,636 A 8/1999 Uyeno et al.
6,016,038 A 1/2000 Mueller et al.
(Continued)

FOREIGN PATENT DOCUMENTS

EP 1324578 7/2003
GB 2383716 7/2003
WO 03077505 9/2003

*Primary Examiner* — Creighton Smith
(74) *Attorney, Agent, or Firm* — TraskBritt

(57) ABSTRACT

Systems and methods are disclosed for visually indicating an occurrence of an event. A spatial visual indicator system comprises a spatial visual indicator including a plurality of illuminatable elements configured in at least a two-dimensional arrangement. The spatial visual indicator displays a visual indicator pattern corresponding to a detected event. A control circuit is configured to detect an event, and cause a transceiver to send a communication indicating a visual indicator pattern corresponding to the event to the spatial visual indicator. The spatial visual indicator is configured to display the visual indicator pattern. The spatial visual indicator is located remote to the transceiver. A method of indicating an occurrence of an event comprises receiving a communication indicating one of a plurality of visual indicator patterns that is associated with a detected event. The method also includes displaying the one of the plurality of visual indicator patterns.

26 Claims, 19 Drawing Sheets

(51) Int. Cl.
  *H04M 1/57*  (2006.01)
  *H04M 3/04*  (2006.01)
  *H04M 3/42*  (2006.01)
  *H04M 19/04*  (2006.01)
  *H04M 1/725*  (2006.01)

(56) References Cited

U.S. PATENT DOCUMENTS

| | | |
|---|---|---|
| 6,150,774 A | 11/2000 | Mueller et al. |
| 6,166,496 A | 12/2000 | Lys et al. |
| 6,211,626 B1 | 4/2001 | Lys et al. |
| 6,340,868 B1 | 1/2002 | Lys et al. |
| 6,459,919 B1 | 10/2002 | Lys et al. |
| 6,528,954 B1 | 3/2003 | Lys et al. |
| 6,577,080 B2 | 6/2003 | Lys et al. |
| 6,608,453 B2 | 8/2003 | Morgan et al. |
| 6,690,955 B1 | 2/2004 | Komiyama |
| 6,717,376 B2 | 4/2004 | Lys et al. |
| 6,720,745 B2 | 4/2004 | Lys et al. |
| 6,788,011 B2 | 9/2004 | Mueller et al. |
| 6,806,659 B1 | 10/2004 | Mueller et al. |
| 6,888,322 B2 | 5/2005 | Dowling et al. |
| 6,897,624 B2 | 5/2005 | Lys et al. |
| 6,975,079 B2 | 12/2005 | Lys et al. |
| 7,085,358 B2 | 8/2006 | Ruckart |
| 7,135,824 B2 | 11/2006 | Lys et al. |
| 7,186,003 B2 | 3/2007 | Dowling et al. |
| 7,231,060 B2 | 6/2007 | Dowling et al. |
| 7,242,152 B2 | 7/2007 | Dowling et al. |
| 7,352,339 B2 | 4/2008 | Morgan et al. |
| 7,385,359 B2 | 6/2008 | Dowling et al. |
| 7,443,964 B2 | 10/2008 | Urban et al. |
| 7,610,044 B2 | 10/2009 | Sindoni |
| 7,642,730 B2 | 1/2010 | Dowling et al. |
| 7,764,026 B2 | 7/2010 | Dowling et al. |
| 7,769,141 B2 | 8/2010 | Cupal et al. |
| 7,929,675 B2 | 4/2011 | Ruckart |
| 2002/0183098 A1 | 12/2002 | Lee et al. |
| 2007/0112977 A1 | 5/2007 | Hornal et al. |
| 2008/0167995 A1 | 7/2008 | Cue et al. |
| 2011/0065321 A1* | 3/2011 | Wang .................. 439/620.01 |

* cited by examiner

SYSTEMS AND RELATED METHODS FOR VISUAL INDICATION OF AN OCCURRENCE OF AN EVENT

CROSS-REFERENCE TO RELATED APPLICATION

This application is a continuation-in-part of U.S. patent application Ser. No. 13/795,105, entitled "Methods, Devices, and Systems for Creating or Sharing a Visual Indicator Pattern," filed Mar. 12, 2013, pending, the disclosure of which is hereby incorporated in its entirety herein by this reference.

TECHNICAL FIELD

The present disclosure relates to visual indication of an occurrence of an event and, more particularly, to visual indication of an occurrence to a hearing-impaired person.

BACKGROUND

The use of indicators for identifying the activation of a device is commonplace. One predominant form of indicators utilizes an audible or sound-based mechanism for providing notification to a user. However, some persons may have impaired hearing capabilities and may even be completely deaf to audible indicators. Accordingly, such individuals are at a distinct disadvantage to detect and respond to such audible indicating devices.

One such device that has traditionally relied upon an audible indicator is a telephone or similar telecommunications device. Such devices have conventionally utilized a bell, a speaker, or other audible device for notification to a user of an incoming call. For hearing-impaired users, or in environments that are not conducive to audible indicator detection, visual indicators have been developed. One known visual indication approach utilized by hearing-impaired users for identifying an incoming telephone call is illustrated with reference to a conventional visual notification system 100, as illustrated in FIG. 1. This prior approach connects a conventional telephone 200 through a coupling circuit 102 to a room lamp 104 or other light source. The coupling circuit 102, upon detection of a telephone "ring" signal on a communication network 106, causes, for example, a room light or lamp 104 to flash repeatedly when a ringing voltage or other signal designates an incoming call.

In such applications, and to the hearing-impaired community, telephone-coupling circuits and single light source visual indicator have often been referred as "flashers." Flashers or visual indicators may be implemented as a single light source located on or near the telephone or may be coupled to a more generally present light source, such as a light bulb or lamp in a room inhabited by a hearing-impaired user. While such visual indicators provide notification to a user thereof, such visual indicators are "one dimensional" in information conveyed in that they provide only a notification of the occurrence of an event (e.g., the ringing of an incoming call).

While visual indicators exist that provide a visual indication of the existence of, for example, an incoming call, such visual notifications often do not adequately alert a user and may go unnoticed. For example, FIG. 2 illustrates a conventional telephone 200 configured with a caller identification display 208 that provides a visual notification of an incoming call, and even provides information correlated to the calling party. While the caller identification display 208 is configured to provide correlated information of the calling party, the caller identification display 208 may not, however, adequately provide a visual alert to draw attention to the telephone 200.

An example of a system that provides an improved visual indication of the origin of incoming calls is described in U.S. Pat. No. 7,769,141 to Cupal et al., issued Aug. 3, 2010 (hereinafter "Cupal"), the disclosure of which is hereby incorporated in its entirety herein by this reference. FIG. 3 illustrates a simplified diagram of a spatial visual indicator system 300 according to the disclosure of Cupal. Cupal describes a visual indicator system 300 including a telephone 200 and a spatial visual indicator device 310 configured to capture caller identification information from an incoming call on a communication network 306, and compare the caller identification information to a list of stored entries of reference caller identification information. The spatial visual indicator device 310 activates a plurality of illuminatable elements 304 on a spatial visual indicator 312 according to a spatial visual indicator pattern corresponding to a stored entry of reference caller identification information that matches the captured caller identification information from the incoming call. Although the visual indicator system 300 described by Cupal improves visual indication of the origin of incoming calls, a user that is not within sight of the telephone 200 may not see the spatial visual indicator pattern displayed by the visual indicator device 310.

BRIEF SUMMARY

In some embodiments, the present disclosure comprises a spatial visual indicator system. The spatial visual indicator system comprises a spatial visual indicator including a plurality of illuminatable elements configured in at least a two-dimensional arrangement. The spatial visual indicator is configured to communicate with a transceiver located remotely from the spatial visual indicator. The spatial visual indicator is also configured to display a first visual indicator pattern corresponding to a first event responsive to receiving a communication from the transceiver indicating the first visual indicator pattern.

In some embodiments, the present disclosure comprises a method of indicating an occurrence of an event. The method includes receiving, with a spatial visual indicator, a communication from a transceiver located remotely to the spatial visual indicator, the communication indicating a visual indicator pattern that is associated with a detected event. The method also includes displaying the visual indicator pattern with a plurality of illuminatable elements configured in at least a two-dimensional arrangement on the spatial visual indicator.

In some embodiments, the present disclosure comprises a method of indicating an occurrence of an event. The method includes detecting an occurrence of an event with a control circuit. The method also includes causing a transceiver to send a communication to one or more spatial visual indicators located remotely to the transceiver. The communication indicates a visual indicator pattern that is associated with the detected event. The one or more spatial visual indicators each comprise a plurality of illuminatable elements. The illuminatable elements are configured in at least a two-dimensional arrangement for displaying the visual indicator pattern.

In some embodiments, the present disclosure comprises a spatial visual indicator system. The spatial visual indicator system comprises a control circuit configured to detect an occurrence of an event corresponding to a visual indicator pattern to be displayed by a plurality of illuminatable elements arranged in at least a two-dimensional configuration.

The spatial visual indicator system also comprises a transceiver operably coupled to the control circuit and configured to send a communication indicating the visual indicator pattern corresponding to the detected event to at least one spatial visual indicator that is located remotely to the transceiver.

DETAILED DESCRIPTION

Figure 1:
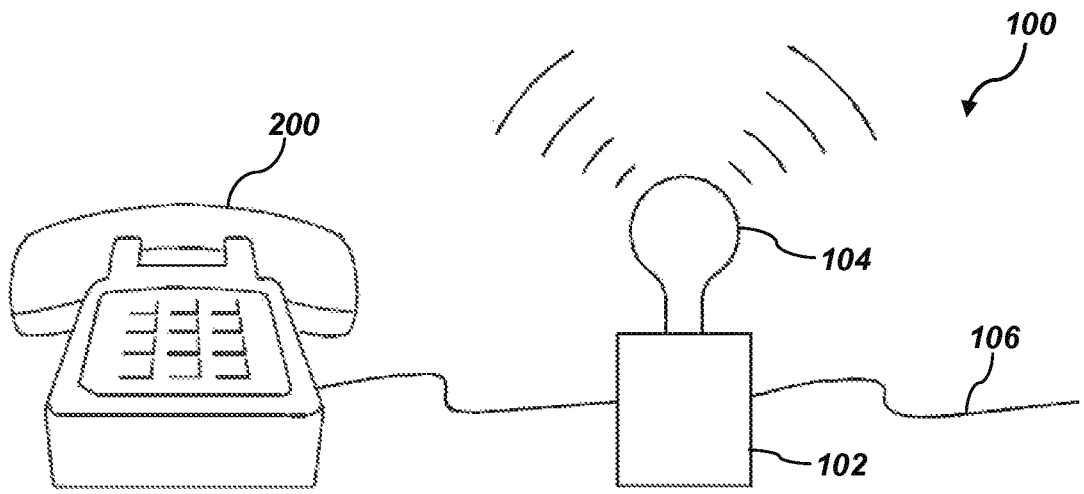
FIG. 1 is a simplified diagram of a conventional visual notification system.

In the following detailed description, reference is made to the accompanying drawings which form a part hereof, and in which is shown by way of illustration specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions rearrangements, or combinations thereof within the scope of the present disclosure may be made and will become apparent to those of ordinary skill in the art.

In accordance with common practice the various features illustrated in the drawings may not be drawn to scale. The illustrations presented herein are not meant to be actual views of any particular apparatus (e.g., device, system, etc.) or method, but are merely idealized representations that are employed to describe various embodiments of the present disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media (i.e., non-transitory media) and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

The term "incoming call" refers to an incoming communication to a communication device such as a portable communication device as well as less portable audio and video communication devices. This incoming communication should be considered to include communications such as, for example, E-mail, text messages, instant messages, voice communications, and video communications.

Embodiments of the present disclosure include systems and related methods for visually indicating an occurrence of an event. It should be noted that while the utility and application of the various embodiments of the present disclosure are described with reference to a hearing-impaired environment, the present disclosure also finds application to any environment where visually indicating an occurrence of an event may be helpful or desirable.

Figure 4:
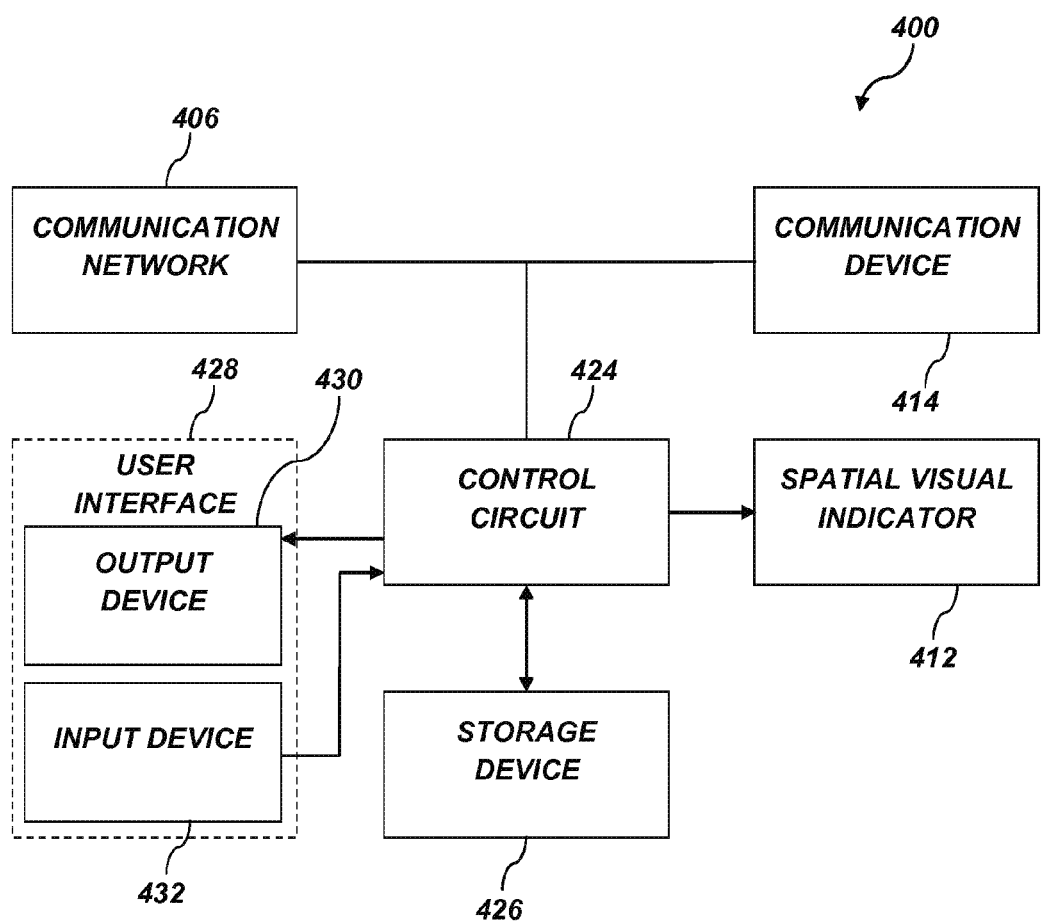
FIG. 4 is a simplified block diagram of a spatial visual indicator system with an improved user interface.

FIG. 4 is a simplified block diagram of a spatial visual indicator system 400 with an improved user interface. As previously stated, visual indicators for conventionally audible indicating devices provide utility to hearing-impaired individuals who are physically incapable of detecting audible sounds or in situations where an audible indicator may be difficult to detect, such as in a noisy work environment. The spatial visual indicator system 400 may include a communication network 406, a communication device 414, a user interface 428, a control circuit 424, a storage device 426, and a spatial visual indicator 412. Each of the communication network 406, the communication device 414, the user interface 428, the storage device 426, and the spatial visual indicator 412 may be coupled to, and configured to communicate with, the control circuit 424.

The storage device 426 may include any one or combination of a random access memory, a computer readable media, a flash memory, and an erasable programmable read only memory, etc. The storage device 426 may be configured to store a plurality of visual indicator patterns and a plurality of possible events that correspond to the plurality of visual indicator patterns. The plurality of visual indicator patterns may be configured for displaying on the spatial visual indicator 412.

As non-limiting examples, the plurality of possible events may include a plurality of possible conditions of an incoming communication, such as information that identifies the source of the incoming communication. Examples of information that may be used to identify the source of the informing communication may include a telephone number, an IP address, a media access control (MAC) address, or other similar information. Each event of the plurality of possible events may be assigned a corresponding visual indicator pattern of the plurality of visual indicator patterns.

The spatial visual indicator 412 may include a plurality of illuminatable elements, which may be arranged in at least a two-dimensional arrangement. The plurality of illuminatable elements may be configured to be varied according to at least one characteristic (e.g., color, brightness, position, etc.) in order to display each of the plurality of visual indicator patterns. By way of example, and not of limitation, the plurality of illuminatable elements may include a plurality of red green blue (RGB) light emitting diodes (LEDs) arranged in at least a two-dimensional arrangement (e.g., a circular ring). Also by way of example, and not of limitation, the plurality of illuminatable elements may include a screen display configured to display a plurality of shapes arranged in at least a two-dimensional arrangement. As non-limiting examples, the screen display may include any of an LED array, a liquid crystal display, a cathode ray tube display, and a plasma display.

The spatial visual indicator 412 may be configured to include one or more devices configured to alter a user's perception of a displayed visual indicator pattern. By way of non-limiting example, the spatial visual indicator 412 may include optical elements such as a lens, a diffuser, and an infinity mirror. More detail with respect to the lens will be discussed below with respect to FIGS. 7A through 7E.

The spatial visual indicator 412 may be configured to display each of the plurality of visual indicator patterns. The plurality of visual indicator patterns may each include one or more sequential frames. The one or more sequential frames may each include a presentation of each of the plurality of illuminatable elements, including variations of color, brightness, position, or combinations thereof. TABLE 1 describes a few non-limiting examples of contemplated visual indicator patterns.

TABLE 1

| Name of Pattern | Description |
| --- | --- |
| Altering Colors and Brightness Pattern | Illuminatable elements fading from dim to bright in one color then dim back to off, repeated with a plurality of colors. |
| Dimming Tail Pattern | A first illuminatable element is lit at full brightness. The rest of the illuminatable elements are then lit one at a time, and with each new lighting, each previously lit illuminatable element is dimmed, causing an effect of a trail of diminishing brightness behind a leading illuminatable element. |
| Rainbow Pattern | Illuminatable elements fade from a first color to a second color, repeated through a plurality of colors, with as many shades in between as desired. |
| Sparkling Pattern | Illuminatable elements are lit at random with random brightness levels creating an effect of a sparkling constellation of colors. |
| Police Pattern | The illuminatable elements all alternate from red to blue at full brightness to mimic the lights on top of a police car. |
| Fire Pattern | The illuminatable elements are all lit solid red and their brightness levels are all repeatedly cycled from bright to dim to bright again. |
| Caution Pattern | The illuminatable elements are all repeatedly flashed orange for a brief moment, each flash separated by a pause that lasts twice as long as each flash, mimicking caution lights of traffic barricades. |

The communication network 406 may include a public switched telephone network (PSTN), an internet protocol (IP) network, a mobile network, other suitable network, and combinations thereof. Additionally, the communication network 406 may comprise any one or combination of a personal area network (PAN), a local area network (LAN), a wide area network (WAN), or other suitable network. Furthermore, the communication network 406 may be configured either as a wireless network, such as "wifi," and cellular networks or a wired network.

The user interface 428 may include an input device 432 and an output device 430. The input device 432 and the output device 430 may optionally be implemented together as a single device, as shown with the dotted line of FIG. 4. An example of such a single device may include a touch-screen display. In other embodiments of the present disclosure, the input device 432 and the output device 430 may be implemented as separate devices. By way of example, and not of limitation, the input device 432 may include any one or combination of a mouse, a keyboard, a track pad, a button array, a camera, a microphone, and a remote control. Also by way of example, and not of limitation, the output device 430 may include any one or combination of an LED array, a segmented display, a liquid crystal display, a cathode ray tube display, and a plasma display.

The input device 432 may be configured to sense a command from a user. Also, the user interface 428 may be configured to cause a visual indicator pattern of the plurality of visual indicator patterns to be shared over the communication network 406 responsive to the command, as discussed in more detail below with reference to FIG. 6. The user interface 428 may further be configured to cause another visual indicator pattern to be received through the communication network 406 and stored on the storage device 426, responsive to the command, as also discussed in more detail below with reference to FIG. 6. The user interface 428 may also be configured to enable the user to create and store at least one user-programmed visual indicator pattern to the storage device 426, responsive to the command, as discussed in more detail below with reference to FIGS. 5A and 5B.

The user interface 428 may be implemented, in part, with a software program. Some or all of the software program may be stored and executed remotely and accessed as a web interface. Also, some or all of the software program may be stored and executed as a stand-alone application on a computer, or a personal communication device such as a tablet computer or a cellular telephone. In addition, some or all of the software program may be implemented as a built-in application on the communication device 414.

Figure 2:
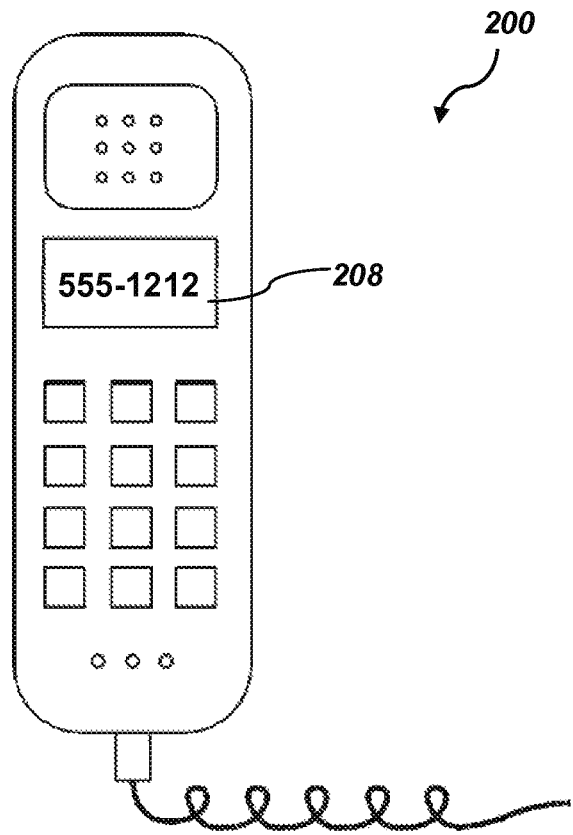
FIG. 2 is a simplified diagram of another conventional visual notification system.
Figure 3:
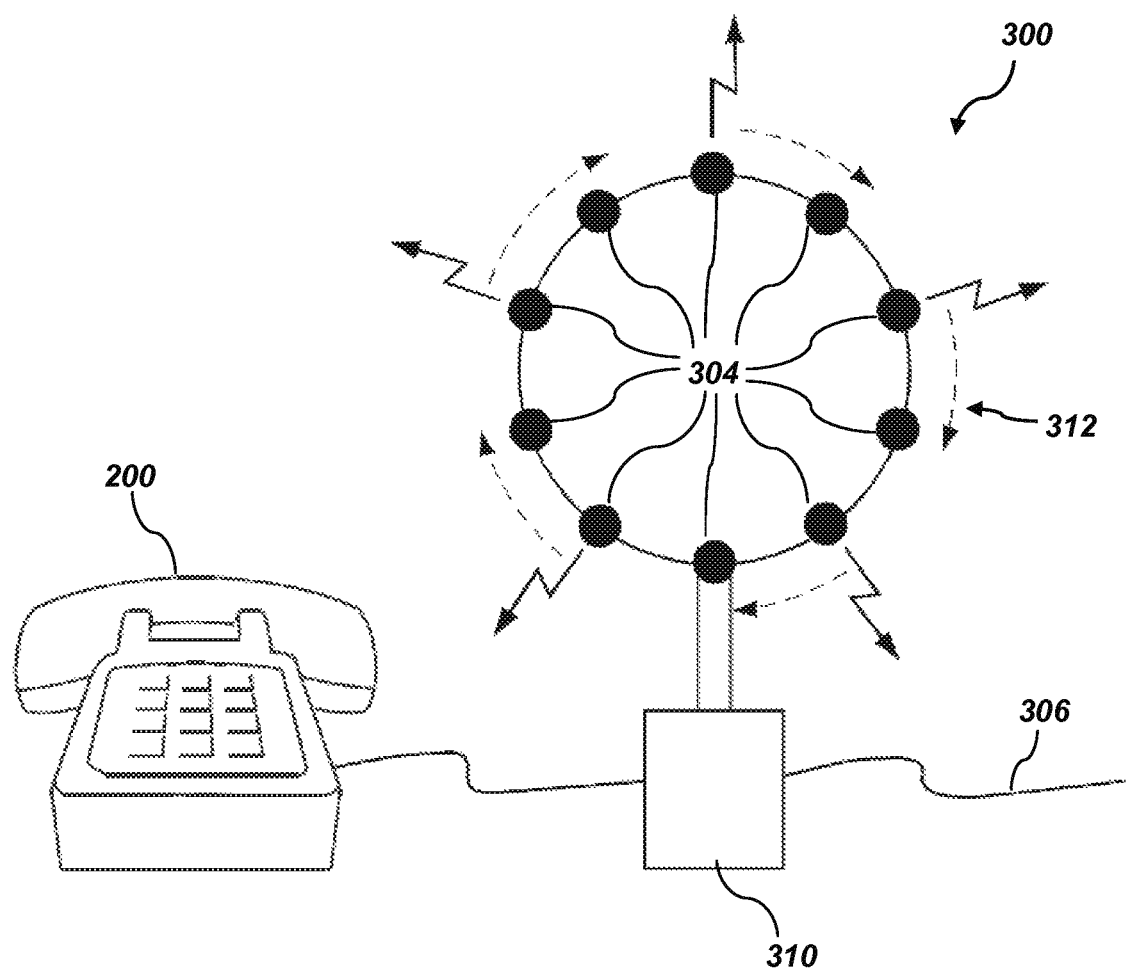
FIG. 3 is as simplified diagram of a conventional spatial visual indicator system.

The communication device 414 may include a conventional telephone 200 (FIGS. 1 through 3), a cellular telephone, a tablet computer, a laptop computer, a desktop computer, a communication device for the hearing impaired such as a video telephone device, a text captioned device, any other device configured to send and receive communications, and combinations thereof.

The control circuit 424 may be configured to control the spatial visual indicator system 400. The control circuit 424 may be operably coupled to the communication network 406, the communication device 414, the user interface 428, the storage device 426, and the spatial visual indicator 412. The control circuit 424 may be configured to monitor the communication network 406 and detect an event (a current condition of an incoming communication). By way of non-limiting example, the current condition may comprise information indicating a source of the incoming communication. An example of such an indication of the incoming communication may include an internet protocol (IP) address, a media access control (MAC) address, a source telephone number, or other similar information.

The control circuit 424 may also be configured to compare the detected event to the plurality of possible events stored on the storage device 426, and direct the spatial visual indicator 412 to display a visual indicator pattern assigned to an event of the plurality of possible events that matches the detected event. The plurality of possible events may be incoming communications from communication devices associated with entries from a contact list, or list of persons the user is acquainted with.

In some embodiments of the present disclosure, more than one element of the spatial visual indicator system 400 may be integrated into a single device. By way of non-limiting example, the user interface 428 may be integrated within the communication device 414. Also by way of non-limiting example, the spatial visual indicator 412 may be integrated into the same device as the user interface 428, permitting the plurality of illuminatable elements to be displayed on the output device 430 of the user interface 428. A further non-limiting example may include combining the user interface 428, the communication device 414, the spatial visual indicator 412, the storage device 426, and the control circuit 424 into a single spatial visual indicator device.

Other combinations or separations of the elements of the spatial visual indicator system 400 are possible, and those of ordinary skill in the art will appreciate that signals may be communicated between the various elements of the spatial visual indicator system 400 in various ways. By way of non-limiting example, the user interface 428 may be implemented remote from the communication device 414 as a portable communication device, such as a tablet computer, a cellular telephone, or a remote control. The user interface 428 may be configured to send and receive signals to the control circuit 424 through any of the communication network 406, a mobile data network, infrared, bluetooth, a wireless network, a cable, and combinations thereof. Also by way of non-limiting example, the input device 432 of the user interface 428 may be implemented as a remote control comprising an infrared transmitter, and the communication device 414 may be implemented as a video telephone together with the output device 430 of the user interface 428 and an infrared receiver.

Figure 5A:
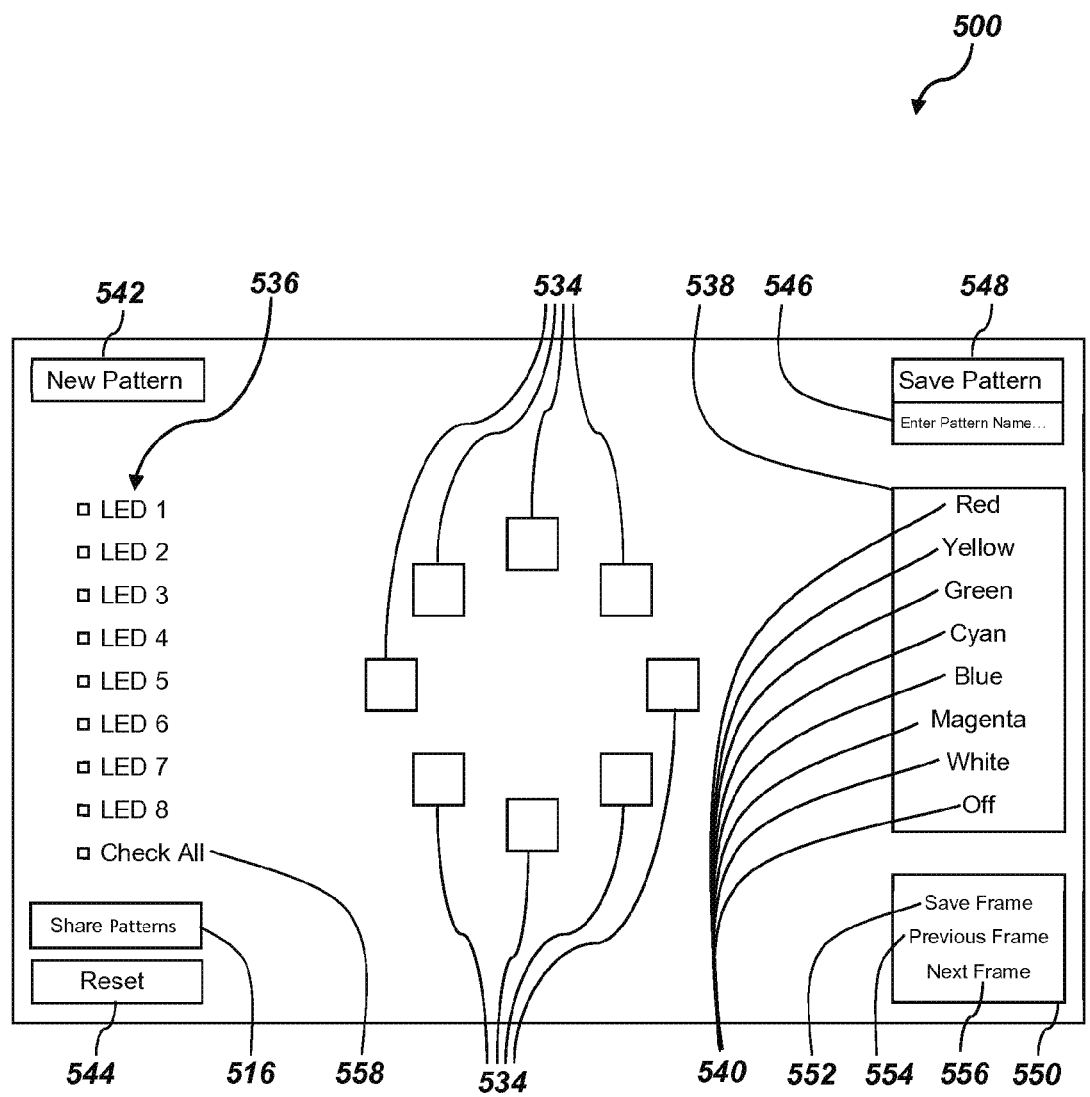
FIG. 5A is a simplified schematic illustration of a user interface of a spatial visual indicator system.

FIG. 5A is a simplified schematic illustration of a non-limiting example for the user interface 428 (FIG. 4) of the spatial visual indicator system 400 in a pattern-editing mode. Referring to FIGS. 4 and 5A together, the user interface 428 may include a screen display 500 configured to display a plurality of illuminatable element indicators 534, a plurality of illuminatable element selection options 536, a color selection field 538, a new pattern option 542, a reset option 544, an enter pattern name field 546, a save pattern option 548, a frame options field 550, and a share patterns option 516.

The plurality of illuminatable element indicators 534 may be configured in an arrangement similar to the plurality of illuminatable elements of the spatial visual indicator 412 (FIG. 4). In the embodiment of FIG. 5A, the user interface 428 includes eight illuminatable element indicators 534 corresponding to eight illuminatable elements of the spatial visual indicator 412, arranged in a circular ring. Other arrangements of illuminatable elements may be utilized, according to other embodiments of the present disclosure. By way of non-limiting example, the illuminatable elements may be arranged in a ring, a uniform spacing, or irregular spacing in any of a limitless possibility of shapes, including a rectangle, a triangle, a circle, and an oval, or combinations thereof. In some embodiments, the plurality of illuminatable elements may be arranged in a three-dimensional manner. Regardless of the manner the plurality of illuminatable elements is arranged in, the plurality of illuminatable element indicators 534 may be configured similarly to the plurality of illuminatable elements.

The plurality of illuminatable element selection options 536 may be configured to enable a user to select one or more of the plurality of illuminatable element indicators 534 for editing. Some of the plurality of illuminatable element selection options 536 may correspond to one of the plurality of illuminatable element indicators 534. Others of the plurality of illuminatable element selection options 536 may include selection options for simultaneously selecting two or more of the plurality of illuminatable element indicators 534, such as a non-limiting example of a "check all" option 558. Although not illustrated in FIG. 5A, the present disclosure contemplates other selection options, including an even illuminatable element selection option, an odd illuminatable element selection option, other suitable selection options, and combinations thereof.

In the embodiment of FIG. 5A, the plurality of illuminatable element selection options 536 do not include the plurality of illuminatable element indicators 534. In other embodiments of the present disclosure, however, the plurality of illuminatable element indicators 534 may themselves be illuminatable element selection options 536.

Still referring to FIGS. 4 and 5A, the color selection field 538 comprises a plurality of color selection options 540 that the user may apply to one or more illuminatable element indicators 534 that have been selected with one or more of the plurality of illuminatable element selection options 536. The embodiment of FIG. 5A illustrates "red," "yellow," "green," "cyan," "blue," "magenta," "white," and "off" color selection options 540. The present disclosure, however, is not so limited. By way of non-limiting example, the color selection field 538 may alternatively include a color pallet, a color wheel, or a color slider. Also by way of non-limiting example, the color selection field 538 may be configured to provide tens, hundreds, thousands, or even more color selection options 540, limited only by the spatial visual indicator's 412 ability to generate a corresponding color at the plurality of illuminatable elements.

Although not pictured in FIG. 5A, the user interface 428 may include a brightness selection field or a position selection field, configured with options to enable the user to vary the brightness or position, respectively, of the illuminatable elements in a user-created visual indicator pattern.

The user interface 428 may cause a new user-created visual indicator pattern to be created responsive to the user selecting the new pattern option. The user interface 428 may also cause a current frame of the user-created visual indicator pattern to be cleared responsive to the user selecting the reset option 544. The user interface 428 may further cause the user-created visual indicator pattern to be saved to the storage device 426 responsive to the user selecting the save pattern option 548. The enter pattern name field 546 may be configured to receive a name for the user-created visual indicator pattern.

The frame options field 550 may include a save frame option 552, a previous frame option 554, and a next frame option 556. The user-created visual indicator pattern may include one or more sequential frames. The plurality of illuminatable element indicators 534, therefore, are configured to display a current frame of the one or more sequential frames. The frame options field 550 may be configured to enable the user to manage the one or more sequential frames.

Responsive to the user selecting the save frame option 552, the user interface 428 may cause the current frame of the user-created visual indicator pattern to be saved to the storage device 426. Also, responsive to the user selecting the previous frame option 554, the user interface 428 may cause a previous frame, if any, of the one or more sequential frames, to be displayed on the plurality of illuminatable element indicators 534. Further, responsive to the user selecting the next frame option 556, the user interface 428 may cause a next frame, if any, to be displayed on the plurality of illuminatable element indicators 534. If there is either no previous frame or no next frame, the user interface 428 may be configured to generate a blank previous or next frame, responsive to selecting the previous frame option 554 or the next frame option 556, respectively.

The share patterns option 516 may be selected to cause the user interface 428 to transition into a pattern-sharing mode (see below with respect to FIG. 6), which may be configured to enable the user to share one or more visual indicator patterns.

Figure 5B:
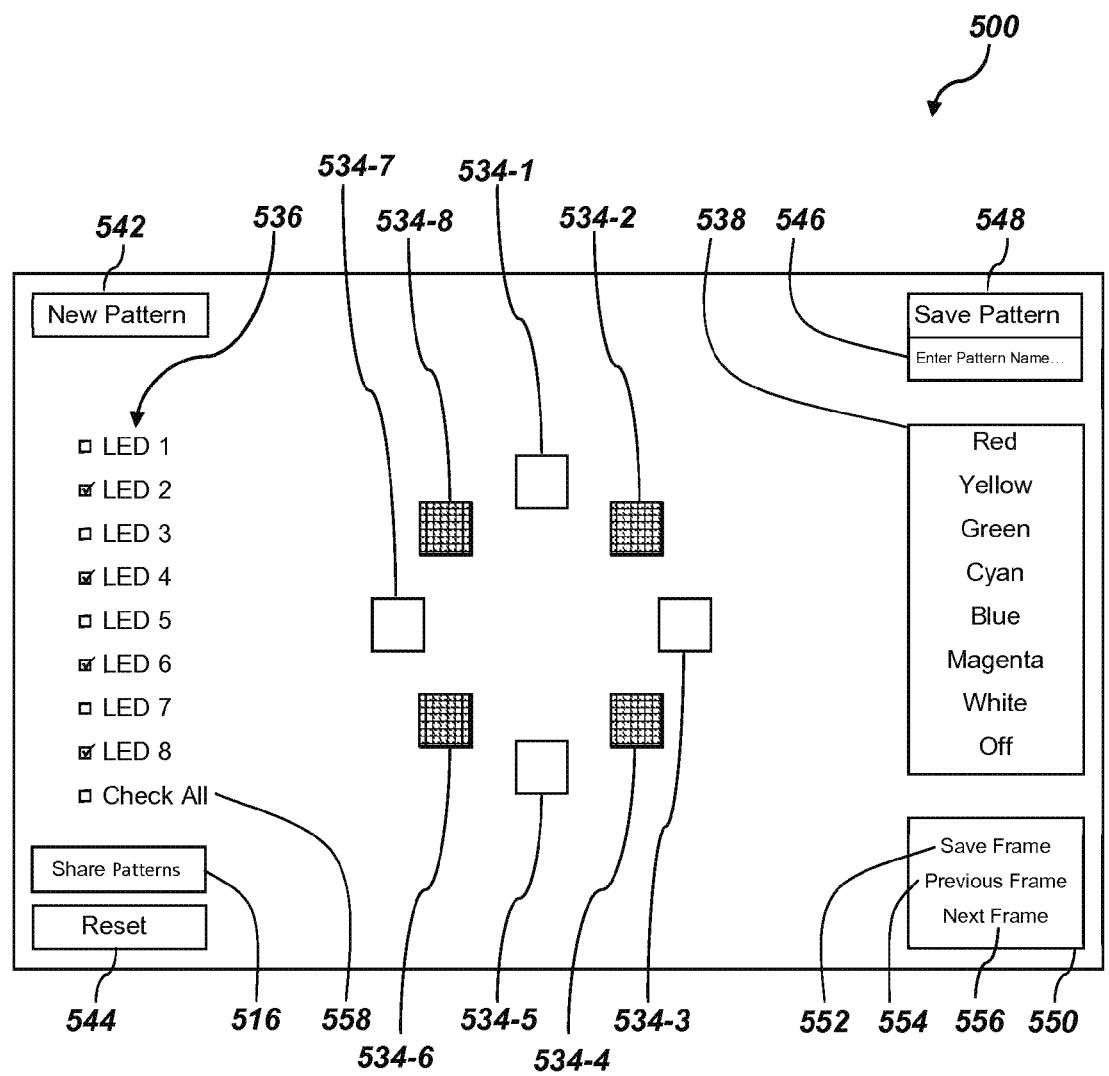
FIG. 5B illustrates the user interface of FIG. 5A after receiving a plurality of commands from a user.

FIG. 5B illustrates the user interface 428 of FIG. 5A after receiving a plurality of commands from a user. Referring to FIGS. 4, 5A, and 5B, the illuminatable elements may be RGB LEDs. As previously discussed, however, the present disclosure is not so limited. In FIG. 5B, the plurality of illuminatable element selection options 536 include "LED 1" through "LED 8" selection options. The LED 1 through LED 8 selection options correspond to illuminatable element indicators 534-1 through 534-8, respectively.

FIG. 5B shows a plurality of illuminatable element selection options 536. Specifically, LED 2, LED 4, LED 6, and LED 8 selection options 536 are marked as selected in FIG. 5B. Following the selection of LED 2, LED 4, LED 6, and LED 8 selection options 536, the yellow color selection option 540 from the color selection field 538 was selected. As a result, illuminatable element indicators 534-2, 534-4, 534-6, and 534-8 are shown shaded yellow in FIG. 5B.

Figure 6:
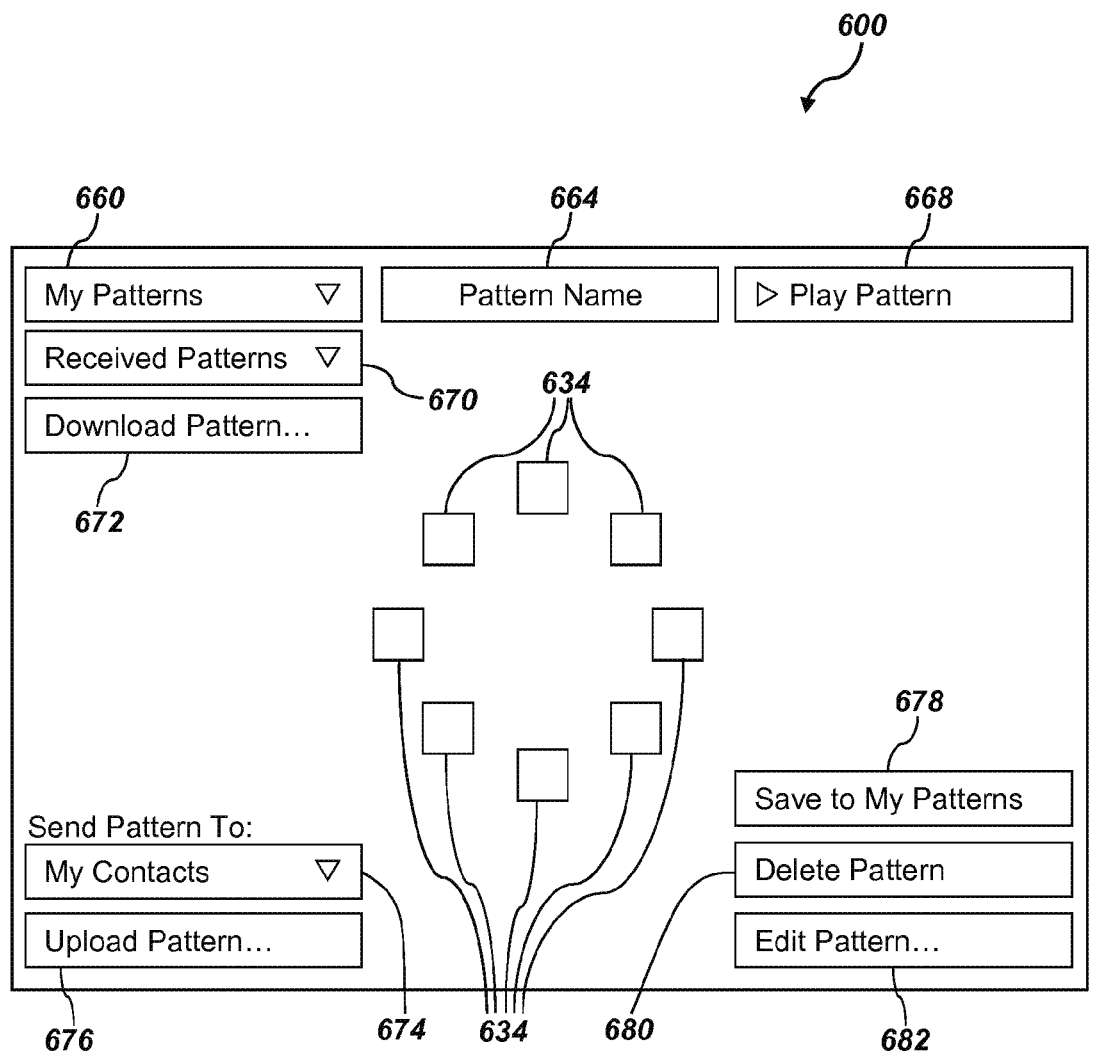
FIG. 6 is a simplified schematic illustration of the user interface of the visual indicator system 400 in a pattern-sharing mode.

FIG. 6 is a simplified schematic illustration of the user interface 428 (FIG. 4) of the spatial visual indicator system 400 in a pattern-sharing mode. Referring to FIGS. 4 and 6, the user interface 428 may include a screen display 600 configured to display a plurality of illuminatable element indicators 634, a my patterns option 660, a pattern name field 664, a play pattern option 668, a received patterns option 670, a download pattern option 672, a send to contact option 674, an upload pattern option 676, a save pattern option 678, a delete pattern option 680, and an edit pattern option 682.

The plurality of illuminatable element indicators 634 may be configured as the plurality of illuminatable element indicators 534 described above with respect to FIGS. 5A and 5B.

The my patterns option 660 may be configured as a drop-down menu that displays a list of names that correspond to the plurality of visual indicator patterns stored in the storage device 426 responsive to the user selecting the my patterns option 660. A name of a visual indicator pattern may then be selected.

The received patterns option 670 may be configured as a drop-down menu that displays a list of names that correspond to one or more received visual indicator patterns, responsive to the user selecting the received patterns option 670. The one or more received visual indicator patterns may be visual indicator patterns that other users of similar spatial visual indicator systems 400 sent to the user. A name from the list of names that correspond to the one or more received visual indicator patterns may be selected.

The download pattern option 672 may be selected to cause the user interface 428 to establish communication with a website or a database through the communication network 406, and enable the user to select and download one or more of a plurality of downloadable visual indicator patterns.

The pattern name field 664 may be configured to display a name of a visual indicator pattern that has been selected using one of the my patterns option 660, the received patterns option 670, or the download pattern option 672.

The play pattern option 668 may be selected to cause the plurality of illuminatable element indicators 634 to sequentially display each frame of one or more frames that make up the visual indicator pattern that corresponds to the name that is displayed in the pattern name field 664 (hereinafter "the selected visual indicator pattern"). The play pattern option 668, therefore, may enable the user to observe the selected visual indicator pattern.

The send to contact option 674 may be selected to cause the user interface 428 to display a list of contacts. Responsive to the user selecting from the list of contacts, the user interface 428 may be sent to a similar spatial visual indicator system 400 that belongs to the selected contact through the communication network 406.

The upload pattern option 676 may be selected to cause the selected visual indicator pattern to be uploaded to a website or a database. Uploading the selected visual indicator pattern may allow other users to download the selected visual indicator pattern.

The save pattern option 678 may be selected to cause the selected visual indicator pattern to be saved to the storage device 426.

The delete pattern option 680 may be selected to cause the selected visual indicator pattern to be removed from the storage device 426.

The edit pattern option 682 may be selected to cause the user interface 428 to transition into the pattern-editing mode (see above with respect to FIGS. 5A and 5B), which may be configured to enable the user to create one or more visual indicator patterns.

Figure 7A:
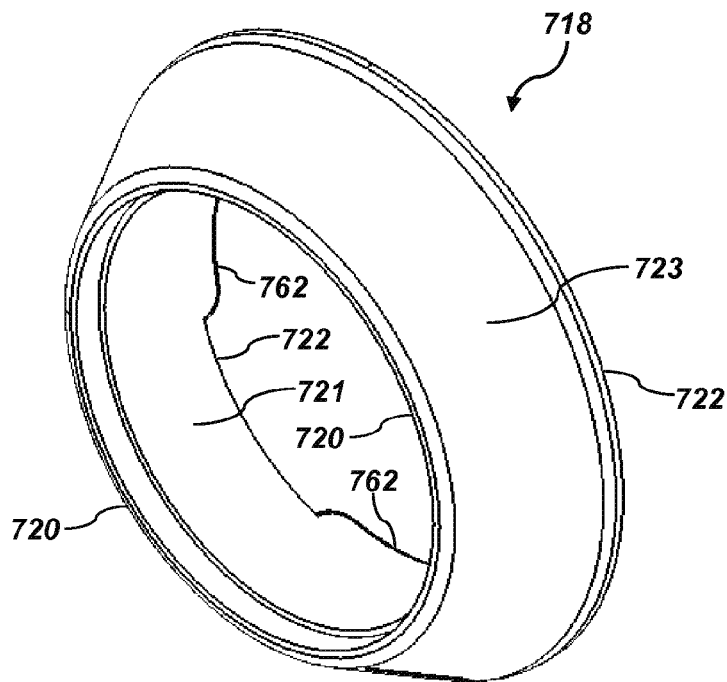
FIGS. 7A through 7E illustrate a lens configured for mounting in front of illuminatable elements of a spatial visual indicator as shown in FIG. 4.
Figure 7B:
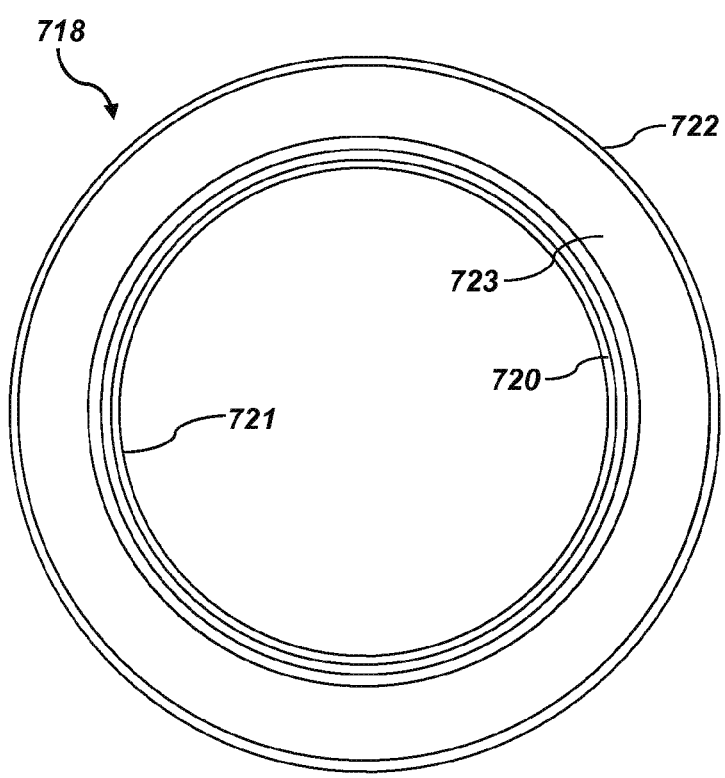
Figure 7C:
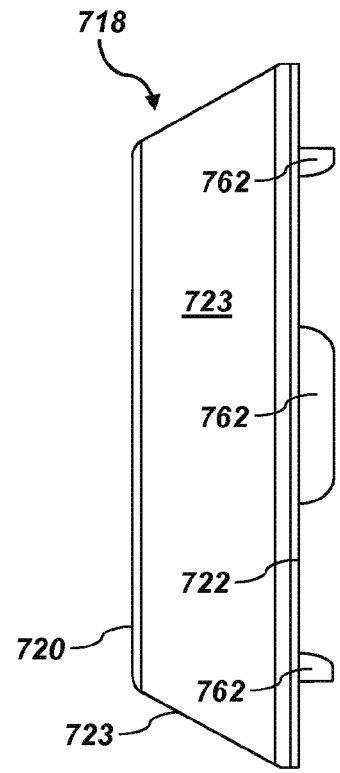
Figure 7D:
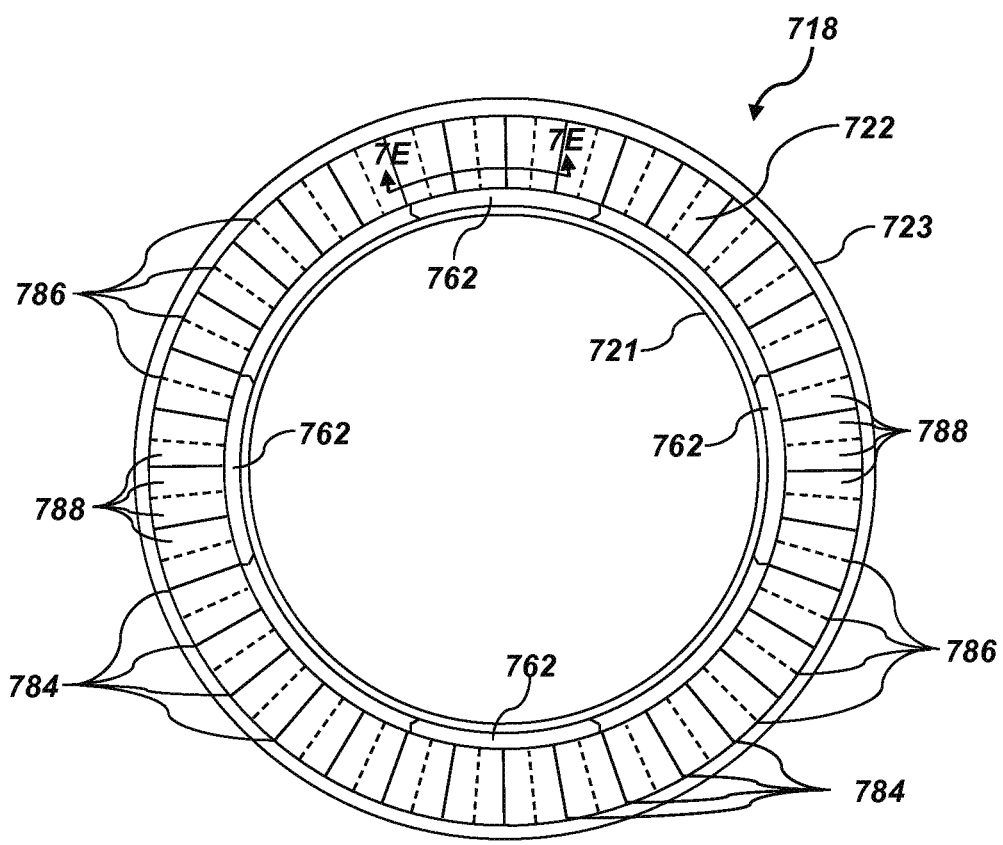

FIGS. 7A through 7D illustrate a lens 718 configured for mounting in front of the illuminatable elements of the spatial visual indicator 412 (FIG. 4). FIG. 7A is a simplified perspective view of the lens 718, FIG. 7B is a plan view of a front side 720 of the lens 718, FIG. 7C is a side view of the lens 718, and FIG. 7D is a plan view of a back side 722 of the lens 718. Referring to FIGS. 7A through 7D together, the lens 718 may include an outer surface 723 and an inner surface 721. The lens 718 may include one or more connecting members 762 extending from the back side 720 near the inner surface 721 of the lens 718.

By way of non-limiting example, the lens 718 may include a transparent plastic, a translucent plastic, a glass, a clear acrylic, a trivex, a polycarbonate, and combinations thereof. Also by way of non-limiting example, the lens 718 may comprise a material with a refractive index of approximately 1.49. Those of ordinary skill in the art will recognize that many different materials include optical properties and a wide range of refractive indices, and the lens 718 may include any of a variety of materials with optical properties suitable for the embodiments discussed herein.

Figure 7E:
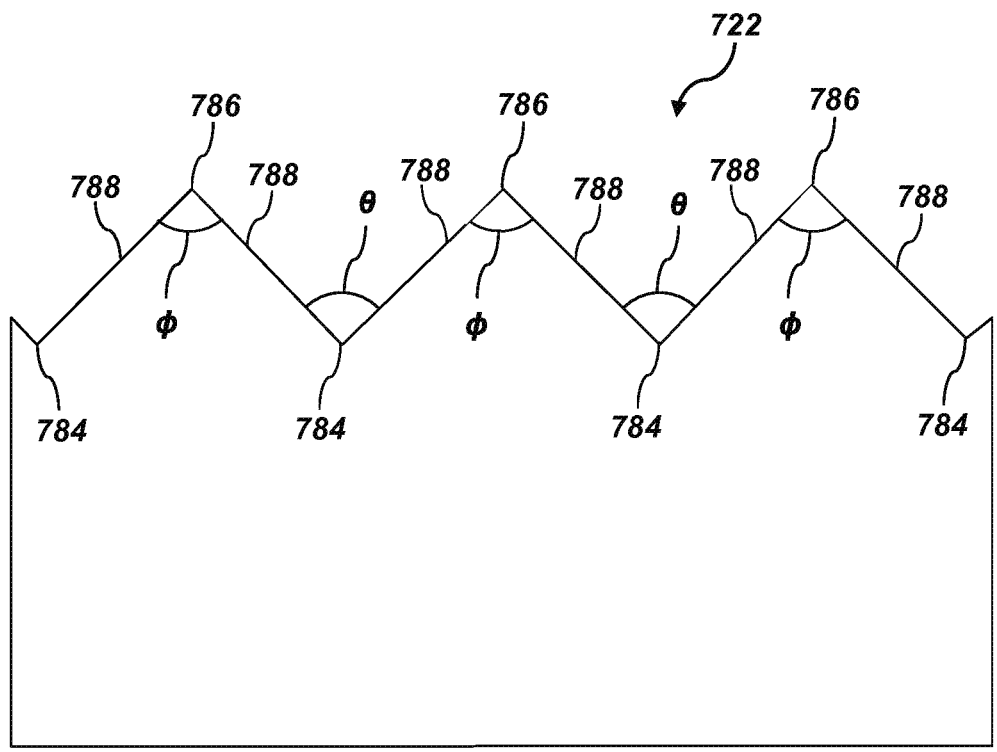

The back side 720 of the lens 718 may include a plurality of valleys 784 (solid lines on FIG. 7D) and a plurality of peaks (dashed lines on FIG. 7D) 786 defined by a plurality of facets 788. FIG. 7E is a cross-sectional view of a portion of the back side 722 of the lens 718, the cross-section taken along line 7E of FIG. 7D. Although the line 7E of FIG. 7D is curved, the cross-sectional view of FIG. 7E is depicted as a flat cross section, for convenience. Referring to FIGS. 7D and 7E together, each of the plurality of valleys 784 may be located at the bottom of two facets 788 forming an angle θ with respect to each other. Likewise, each of the plurality of peaks may be located at the top of two facets 788 forming an angle φ with respect to each other. In some embodiments, all the angles θ and φ may be equal to ninety degrees. In other embodiments, the angles θ and φ at different valleys 784 and peaks 786 may vary.

The valleys 784 and peaks 786 may be formed by placing heated lens material into a mold configured with valleys 784 and peaks 786, and allowing the heated lens material to cool. The valleys 784 and peaks 786 may also be formed by grinding and/or cutting a cool mass of the lens material into the valleys 784 and peaks 786. By way of non-limiting example, the valleys 784 and peaks 786 may be formed by hand grinding and/or cutting facets 788 into the lens material. Also by way of non-limiting example, a laser may be used to cut the facets 788 into the lens material.

Referring again to FIGS. 7A through 7D, in some embodiments, the front side 720, the outer surface 723, and the inner surface 721 of the lens 718 may be substantially smooth. In other embodiments, one or more facets 788 may be formed into the front side 720, the outer surface 723, and/or the inner surface 721 of the lens 718. In still other embodiments, the outer surface 723 of the lens may be coated in a layer of material configured to scatter light.

Figure 8A:
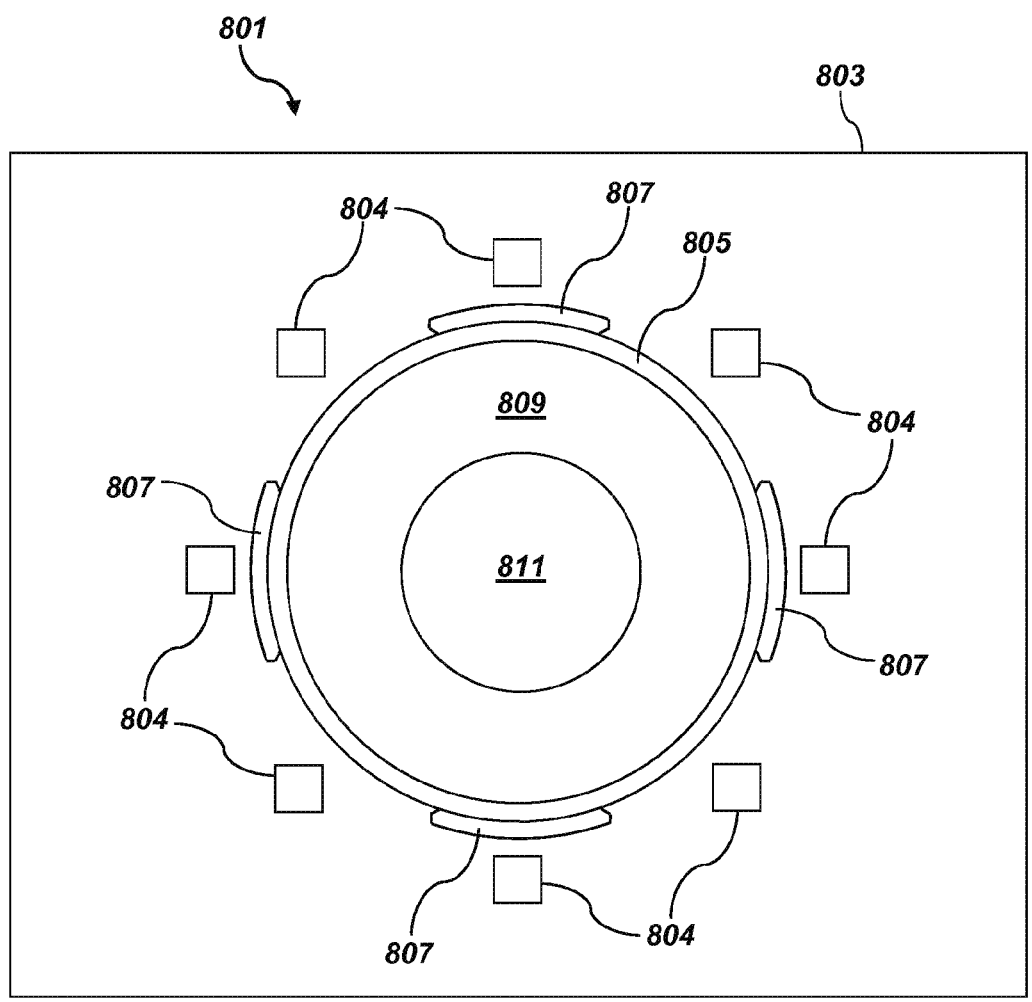
FIGS. 8A and 8B illustrate another arrangement for a spatial visual indicator.

FIG. 8A is a front view of a spatial visual indicator 801. By way of non-limiting example, the spatial visual indicator 801 may include a plate-like member 803, a plurality of illuminatable elements 804, an aperture 805 in the plate-like member 803, a camera lens assembly 809 exposed by the aperture 805, and one or more connecting receptacles 807 around the outside edge of the aperture 805.

Also by way of non-limiting example, the plurality of illuminatable elements 804 may be arranged in a ring pattern around the aperture 805. In some embodiments, each of the plurality of illuminatable elements 804 may be mounted in front of the plate-like member 803. In other embodiments, each of the plurality of illuminatable elements 804 may be located underneath the plate-like member 803, and the plate-like member 803 may be configured with a hole in front of each of the plurality of illuminatable elements 804. In still other embodiments, each of the plurality of illuminatable elements 804 may be located underneath the plate-like member 803, and the plate-like member 803 may comprise a material that permits light from the illuminatable elements 804 to travel through the plate-like member 803, such as, for example, a clear plastic or a glass.

The camera lens assembly 809 may be part of a camera (not shown) located behind the plate-like member 803. The camera lens assembly may include a camera lens 811. The camera may include devices capable of capturing and converting visual images to data, as will be readily apparent to those skilled in the art. By way of non-limiting example, the camera may include a webcam, a camcorder device, and other suitable devices. For applications of the present disclosure related to use by the hearing-impaired, the camera may facilitate communication by recording video images of a user communicating in sign language. In some embodiments, a camera may not be integrated with the spatial visual indicator 801.

Figure 8B:
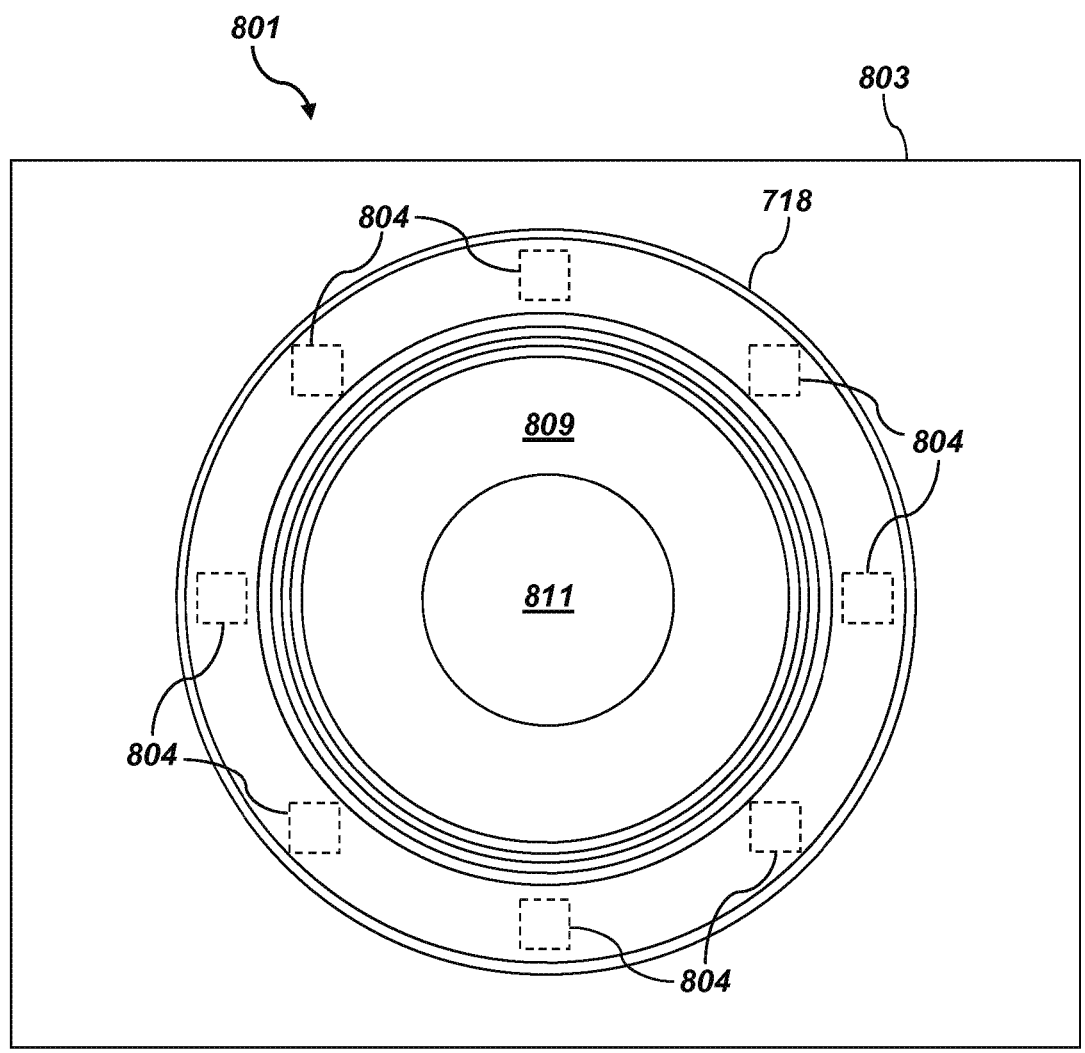

The one or more connecting receptacles 807 may be configured to physically couple to the one or more connecting members 762 of the lens 718 (FIGS. 7A through 7D), such that the back side 722 of the lens 718 faces the plurality of illuminatable elements 804. FIG. 8B is a front view of the spatial visual indicator 801 of FIG. 8A with the lens 718 mounted thereto. The plurality of illuminatable elements 804 are shown with dotted lines to indicate their presence behind the lens 718.

Each of the plurality of illuminatable elements 804 may emit light towards the back side 722 of the lens 718. As the light strikes the back side 722 of the lens 718, the facets 788 may cause the light to reflect externally and internally to the lens 718. The lens 718 may also cause the light to refract, magnify, concentrate, form beams, and combinations thereof.

The lens 718 may cause the light to be spread out at multiple angles within a 180 degree spread. The overall effect may be a sparkling effect.

In some embodiments, instead of all of the plurality of illuminatable elements 804 being mounted to the plate-like member 803, some or all of the plurality of illuminatable elements 804 may be mounted to any of the outer surface 723, the inner surface 721, the front side 720, the back side 722, inside of the lens 718, and combinations thereof.

Figure 9A:
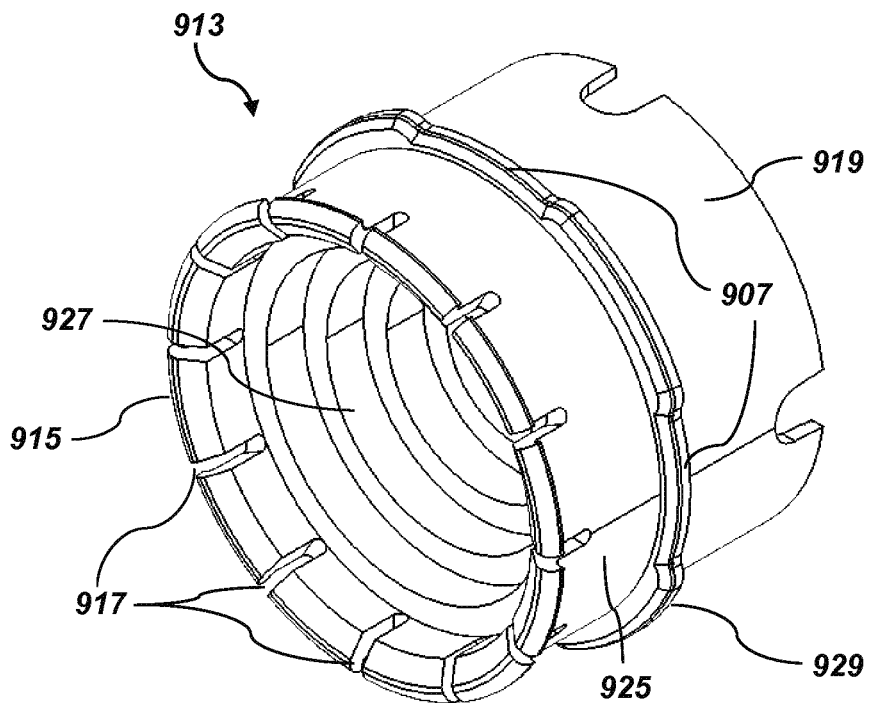
FIGS. 9A through 9C illustrate another arrangement for mounting a lens to a spatial visual indicator.
Figure 9B:
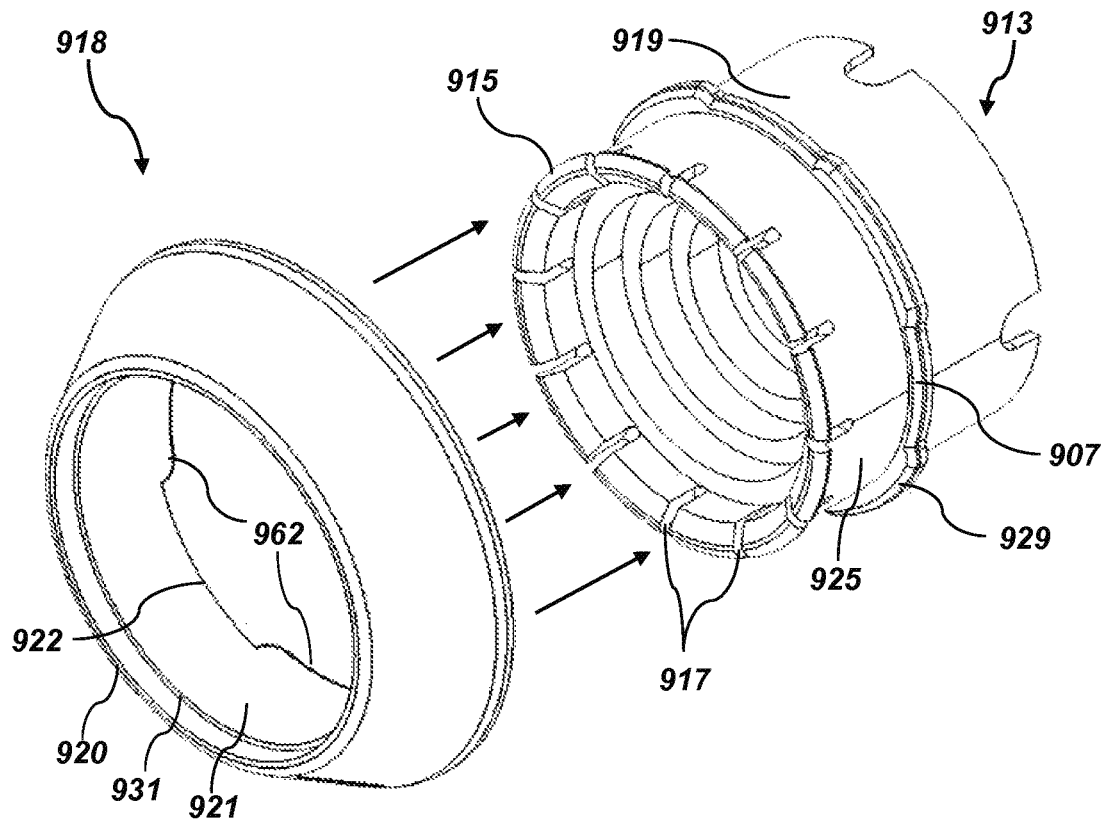
Figure 9C:
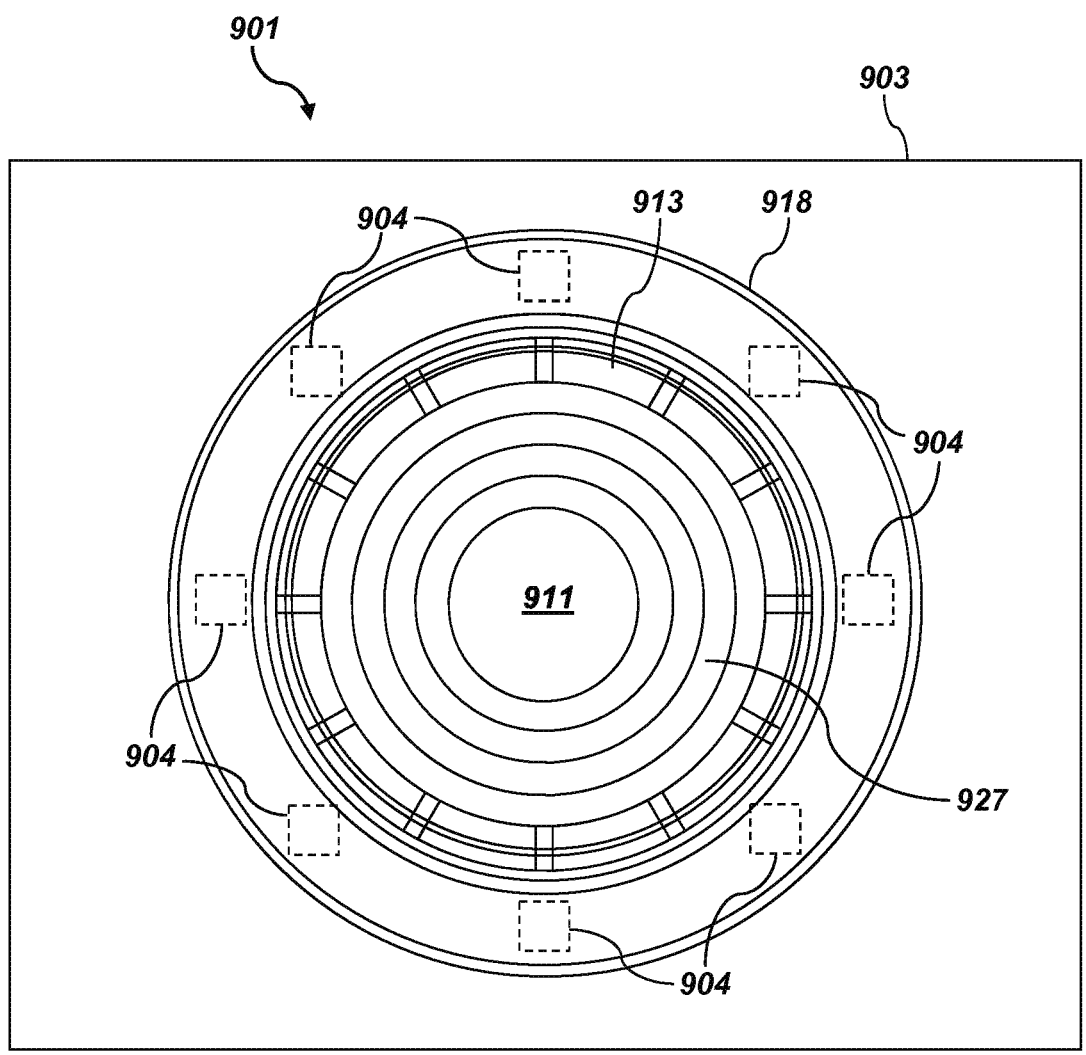

FIGS. 9A through 9C illustrate another method of mounting a lens 918 to a spatial visual indicator 901. FIG. 9A is a perspective view of a sleeve assembly 913 that may be used to mount the lens 918 to the spatial visual indicator 901. The sleeve assembly 913 may include a front portion 925 and a back portion 919 separated by a ridge 929 including one or more connecting receptacles 907. The front portion 925 may include a flanged rim 915 with one or more rim gaps 917. The front portion 925 may also include a terraced interior 927.

FIG. 9B is a perspective view illustrating the physical coupling of the lens 918 to the sleeve assembly 913. An inside surface 921 of the lens 918 may slide over the flanged rim 915 of the sleeve assembly 913 until the flanged rim 915 reaches an interior lip 931 of the lens 918. The rim gaps 917 may enable the flanged rim 915 to flex to fit into a back side 922 of the lens 918. The flanged rim 915 may snap into place at the interior lip 931 of the lens 918. Also, one or more connecting members 962 of the lens 918 may be secured into the one or more connecting receptacles 907 of the sleeve assembly 913.

The lens 918 and the sleeve assembly 913 may be configured such that the inside surface 921 of the lens 918 does not physically couple to the sleeve assembly 913. By way of non-limiting example, a diameter of the inner surface 921 of the lens 918 may be greater than a diameter of the front portion 925 of the sleeve assembly 913. Reducing a surface area of the lens 918 that physically couples to the sleeve assembly 913 may reduce the amount of light absorbed by the sleeve assembly 913, and may increase the amount of light observed by a user.

FIG. 9C is a front view of a spatial visual indicator 901 with the lens 918 and the sleeve assembly 913 mounted thereto. The spatial visual indicator 901 of FIG. 9C may be similar to the spatial visual indicator 801 of FIGS. 8A and 8B, except that a plate-like member 903 may not include the connecting receptacles 807 in the plate-like member 803 of FIG. 8A. The spatial visual indicator 901 of FIG. 9C may otherwise be similar to that of FIGS. 8A and 8B, including the plate-like member 903, a plurality of illuminatable elements 904, an aperture (not shown as it is behind the lens 918 and the sleeve assembly 913), a camera lens assembly (also not shown) including a camera lens 911. Also, the lens 918 of FIGS. 9B and 9C may be similar to the lens 718 of FIGS. 7A through 7E and FIG. 8B.

Referring to FIGS. 9A through 9C together, the lens 918 and the sleeve assembly 913 may be physically coupled together as discussed above with respect to FIG. 9B. The back portion 919 of the sleeve assembly 913 may be configured to slide into the aperture and onto the camera lens assembly of the spatial visual indicator 901. By way of non-limiting example, an inside of the back portion 919 of the sleeve assembly 913 may be hollow, and shaped to fit around and secure to the camera lens assembly. The terraced interior 927 of the front portion 925 of the sleeve assembly 913 may be configured to minimize shadowing of the camera lens 911.

Similar to the lens 718 of FIG. 8B, the lens 918 of FIG. 9C may be positioned in front of the plurality of illuminatable elements 904 (shown with dotted lines to indicate presence behind the lens 918).

Figure 10:
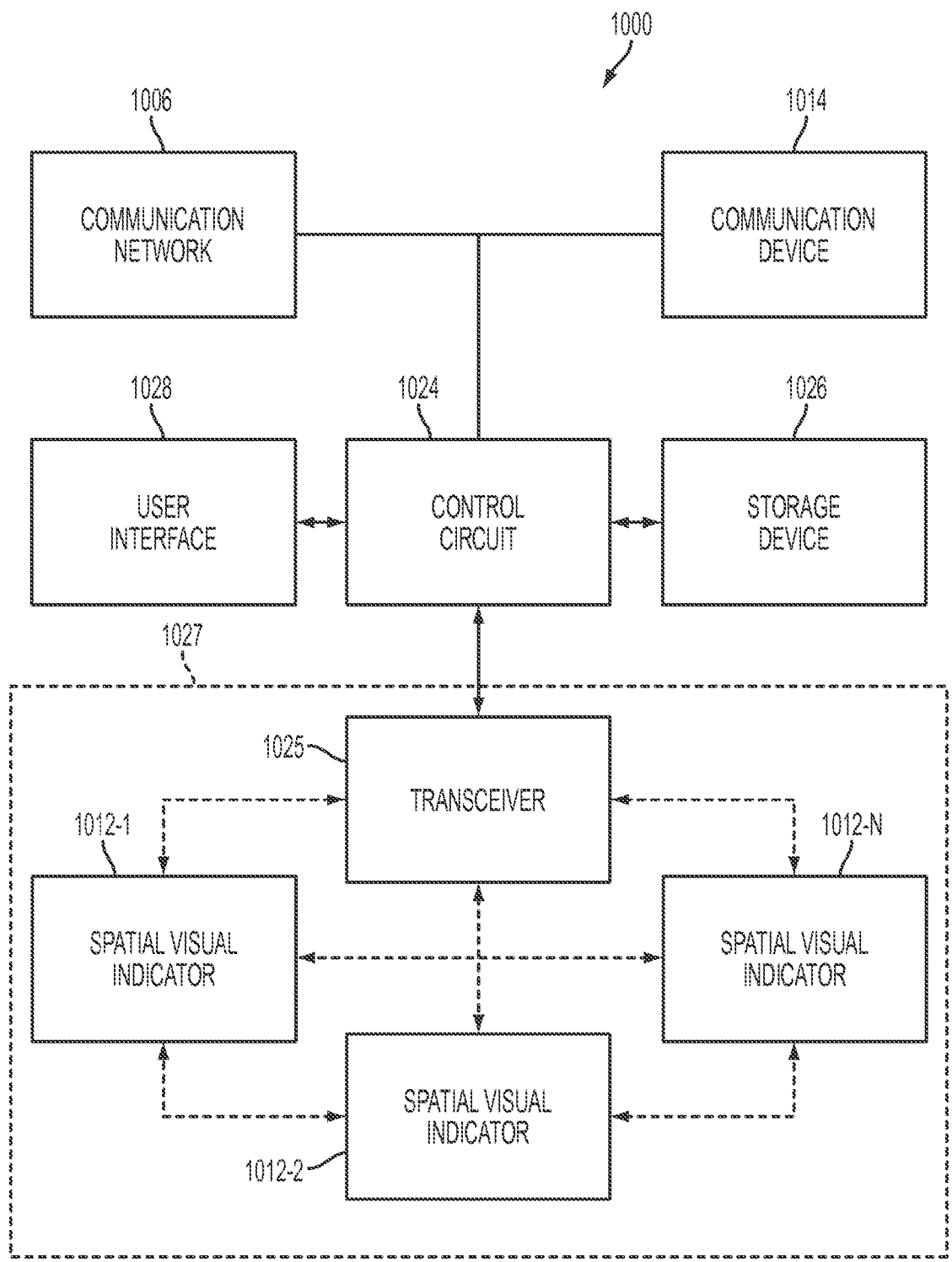
FIG. 10 is a simplified block diagram of a spatial visual indicator system.

FIG. 10 is a simplified block diagram of a spatial visual indicator system 1000 according to an embodiment of the present disclosure. The spatial visual indicator system 1000 may include a communication network 1006, a communication device 1014, a control circuit 1024, a storage device 1026, a user interface 1028, a transceiver 1025, and one or more spatial visual indicators 1012-1, 1012-2, . . . 1012-N (sometimes referred to herein generally together as "spatial visual indicators 1012," and individually as "spatial visual indicator 1012"). Each of the communication network 1006, the communication device 1014, the storage device 1026, the user interface 1028, and the transceiver 1025 may be operably coupled to, and configured to communicate with, the control circuit 1024. The control circuit 1024, the communication network 1006, the communication device 1014, the storage device 1026, and the user interface 1028 may be similar to the control circuit 424, the communication network 406, the communication device 414, the storage device 426, and the user interface 428 of the spatial visual indicator system 400 of FIG. 4.

The spatial visual indicators 1012 may be operably coupled to, and configured to communicate with, the transceiver 1025. Each of the spatial visual indicators 1012 may be configured to receive a communication from the transceiver 1025 indicating a visual indicator pattern corresponding to a detected event. In some embodiments, the communication indicating a visual indicator pattern corresponding to a detected event may include an identifier indicating a visual indicator pattern stored by each spatial visual indicator 1012. In other words, each spatial visual indicator 1012 may have one or more visual indicator patterns stored locally such that the communication indicates which of the locally-stored visual indicator patterns to be displayed. In some embodiments, the communication may include computer-readable instructions the spatial visual indicators 1012 may follow for displaying the visual indicator pattern.

Each of the spatial visual indicators 1012 may also be configured to display the visual indicator pattern indicated by the communication from the transceiver 1025. In some embodiments, each of the spatial visual indicators 1012 may be configured in a mesh network 1027 (e.g., in a wired, or wireless configuration), such that the spatial visual indicators 1012 may be configured to communicate with each of the other spatial visual indicators 1012. For example, the spatial visual indicators 1012 may be configured to route communications from the transceiver 1025 to at least another of the spatial visual indicators 1012. In addition, communications from the transceiver 1025 may be routed through a plurality of spatial visual indicators 1012 to another of the spatial visual indicators 1012. In other words, each of the spatial visual indicators 1012 may be configured to communicate with the transceiver 1025 indirectly through any number of other spatial visual indicators 1012. Thus, the lines of FIG. 10 indicating communication between the transceiver 1025 and the spatial visual indicators 1012, and between the spatial visual indicators 1012, are dashed to indicate that communications from the transceiver 1025 may follow any of a variety of different paths to each of the spatial visual indicators 1012.

In operation, a communication may be sent from the transceiver 1025 to the spatial visual indicator 1012-N directly. In some embodiments, a communication may be sent from the transceiver 1025 to the spatial visual indicator 102-N through one of the spatial visual indicators (e.g., spatial visual indicator 1012-1 or spatial visual indicator 1012-2). In some embodiments, a communication may be sent from the transceiver 1025 to the spatial visual indicator 102-N through multiple spatial visual indicators (e.g., spatial visual indicators 1012-1 and spatial visual indicators 1012-2). Thus, communications between the transceiver 1025 and a spatial visual indicator 1012 may occur with or without direct communication between the transceiver 1025 and the spatial visual indicator 1012.

In some embodiments, the spatial visual indicators 1012 may be configured to communicate wirelessly with the transceiver 1025 and the other spatial visual indicators 1012. By way of non-limiting example, each of the spatial visual indicators 1012 may be configured to communicate using an Ad-hoc On-demand Distance Vector Routing (AODV) protocol, such as with a ZigBee transceiver. Also by way of non-limiting example, other communication protocols (e.g., Bluetooth and WiFi) may be used.

In some embodiments, the spatial visual indicators 1012 may be configured to communicate with the transceiver 1025 and the other spatial visual indicators 1012 through electronic cables. By way of non-limiting example, each of the spatial visual indicators 1012 may include at least one connector configured to interface with an electronic cable, such as an Ethernet cable, a fiber optic cable, other suitable cable, and combinations thereof. Also by way of non-limiting example, communication between the spatial visual indicators 1012 and between the transceiver 1025 and the spatial visual indicators 1012 may be configured as data-over-power lines (e.g., power line communication (PLC), broadband over power lines (BPL), power-line networking, Ethernet over power lines, etc.). As a further non-limiting example, communication between the spatial visual indicators 1012 and between the transceiver 1025 and the spatial visual indicators 1012 may be configured with a combination of wireless and wired communication. Thus, the lines of FIG. 10 indicating communication between the transceiver 1025 and the spatial visual indicators 1012, and between the spatial visual indicators 1012, may indicate wireless communications, wired communications, or a combination thereof.

Similarly to the spatial visual indicator 412 of FIG. 4, each of the spatial visual indicators 1012 may include a plurality of illuminatable elements, which may be arranged in at least a two-dimensional arrangement. Each of the spatial visual indicators 1012 may be configured to display each of the plurality of visual indicator patterns, as discussed above with respect to FIG. 4. By way of non-limiting example, each of the spatial visual indicators 1012 may be configured to display the visual indicator patterns described above in Table 1, as well as other contemplated visual indicator patterns. In some embodiments, a lens 718 (FIGS. 7A through 7E) may be positioned in front of the illuminatable elements of some, or all, of the spatial visual indicators 1012.

In some embodiments, the control circuit 1024 may include a processing circuit configured to execute computer-readable instructions stored in the storage device 1026. The control circuit 1024 may be configured to detect an occurrence of each of a plurality of events corresponding to one of the plurality of visual indicator patterns. The control circuit 1024 may be configured to cause the transceiver 1025 to send a communication indicating a first visual indicator pattern to the spatial visual indicators 1012 responsive to the control circuit 1024 detecting an occurrence of a first event corresponding to the first visual indicator pattern.

In some embodiments, at least one of the plurality of events may comprise receiving an incoming call with the communication device 1014 from a particular one of one or more other communication devices (not shown) through the communication network 1006. In some embodiments, the spatial visual indicators 1012 may serve as visual caller identification devices configured to indicate the identity of a source of an incoming call. In addition, a hearing-impaired user may place the spatial visual indicators 1012 in a variety of locations remote from the communication device 1014. As a result, the hearing-impaired user may be able to be aware of the source of the incoming call at a variety of locations remote from the communication device 1014. For example, the communication device 1014 may be located in a first location (e.g., the kitchen) of the hearing-impaired user's home, and at least one spatial visual indicator 1012 may be located in another location (e.g., the living room, the bedroom, the bathroom, the utility room, etc.) of the hearing-impaired user's home. Of course, a hearing-impaired user may have more than one communication device 1014 and/or more than one spatial visual indicator 1012 at a variety of different locations.

Figure 11:
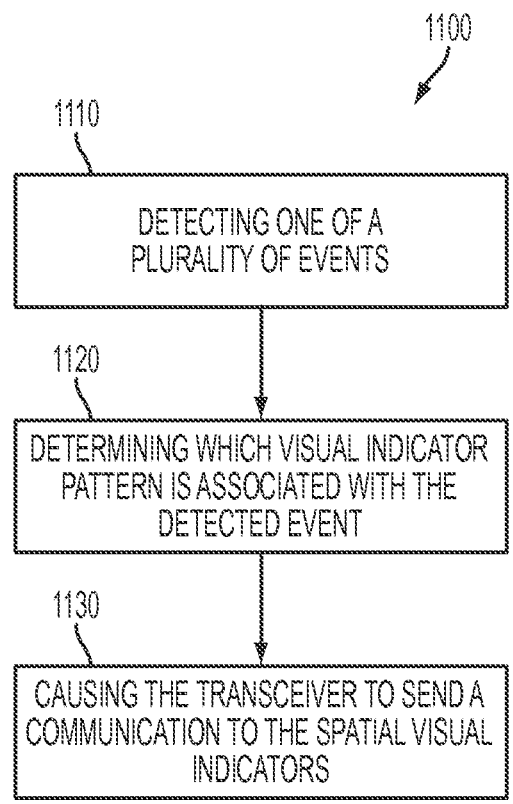
FIG. 11 is a flowchart illustrating a method of indicating an occurrence of an event.

FIG. 11 is a flowchart 1100 illustrating a method of indicating an occurrence of an event associated with a communication device. Referring to FIGS. 10 and 11 together, at operation 1110, the method comprises detecting an occurrence of one of a plurality of events with a control circuit 1024. In some embodiments, detecting the occurrence of one of the plurality of events may comprise detecting an incoming call to the communication device 1014 from a particular other communication device (not shown). In some embodiments, detecting the occurrence of one of the plurality of events may comprise receipt of a message, such as a voicemail message, a text message, a video message, other message, and combinations thereof. In some embodiments, detecting the occurrence of one of the plurality of events may comprise detecting availability of a software update. In some embodiments, detecting the occurrence of one of the plurality of events may comprise detecting a new spatial visual indicator 1012 that was not previously in communication with the transceiver 1025. In some embodiments, detecting the occurrence of one of the plurality of events may comprise detecting a system error.

At operation 1120, the method comprises the control circuit 1024 determining which visual indicator pattern may be associated with the detected event. By way of non-limiting example, the incoming call may be from the user's best friend, which may have an associated visual indicator pattern associated therewith (e.g., a sparkling pattern (Table 1)). Other detected events (e.g., a voicemail message, a text message, a video message, a missed call notification message, a software update message, etc.) may each have its own visual indicator pattern associated therewith, which may be determined by the control circuit 1024 responsive to the detecting the occurrence of the event.

At operation 1130, the method comprises the control circuit 1024 causing the transceiver 1025 to send a communication to one or more spatial visual indicators 1012 located remotely from the transceiver 1025. As previously discussed, the one or more spatial visual indicators 1012 may each include a plurality of illuminatable elements configured in at least a two-dimensional arrangement for displaying each of a plurality of visual indicator patterns. The communication may indicate one of the plurality of visual indicator patterns that is associated with a detected event.

Figure 12:
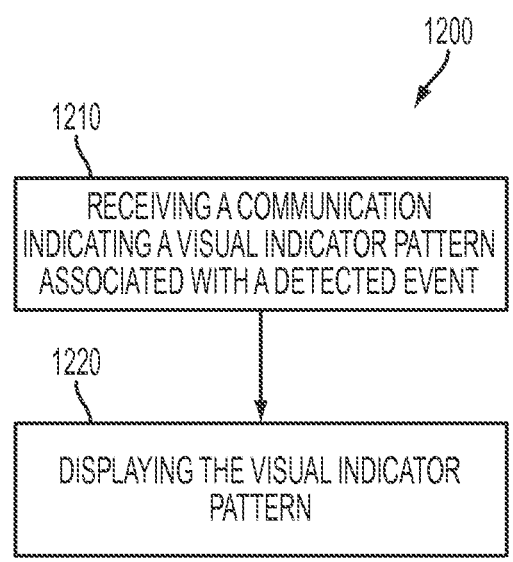
FIG. 12 is another flowchart illustrating a method of indicating an occurrence of an event.

FIG. 12 is another flowchart 1200 illustrating a method of indicating an occurrence of an event. Referring to FIGS. 10 and 12 together, at operation 1210 the method includes the spatial visual indicators 1012 receiving a communication from the transceiver 1025. The received communication may indicate one of a plurality of visual indicator patterns that is associated with the detected event. The spatial visual indicators 1012 are remote from the transceiver 1025. The spatial visual indicators 1012 may receive the communication from the transceiver 1025 directly or indirectly. For example, the communication may be received by one or more spatial visual indicators 1012 by the transceiver directly. In some embodiments, the communication may be received by at least one of the spatial visual indicators 1012, which then routes the communication to other spatial visual indicators 1012 in a mesh network of spatial visual indicators 1012. Also, receiving the communication from the transceiver 1025 may comprise receiving the communication through one of a wireless communication and an electrical cable.

At operation 1220, the method may comprise displaying the received visual indicator pattern on the spatial visual indicator 1012. For example, the received visual indicator pattern may be displayed with a plurality of illuminatable elements that are configured in at least a two-dimensional arrangement on the spatial visual indicator 1012. By way of non-limiting example, if the detected event is an incoming call from the user's best friend, and the visual indicator pattern associated with the incoming call from the user's best friend is the sparkling pattern (Table 1), then the spatial visual indicator 1012 may display the sparkling pattern.

Figure 13:
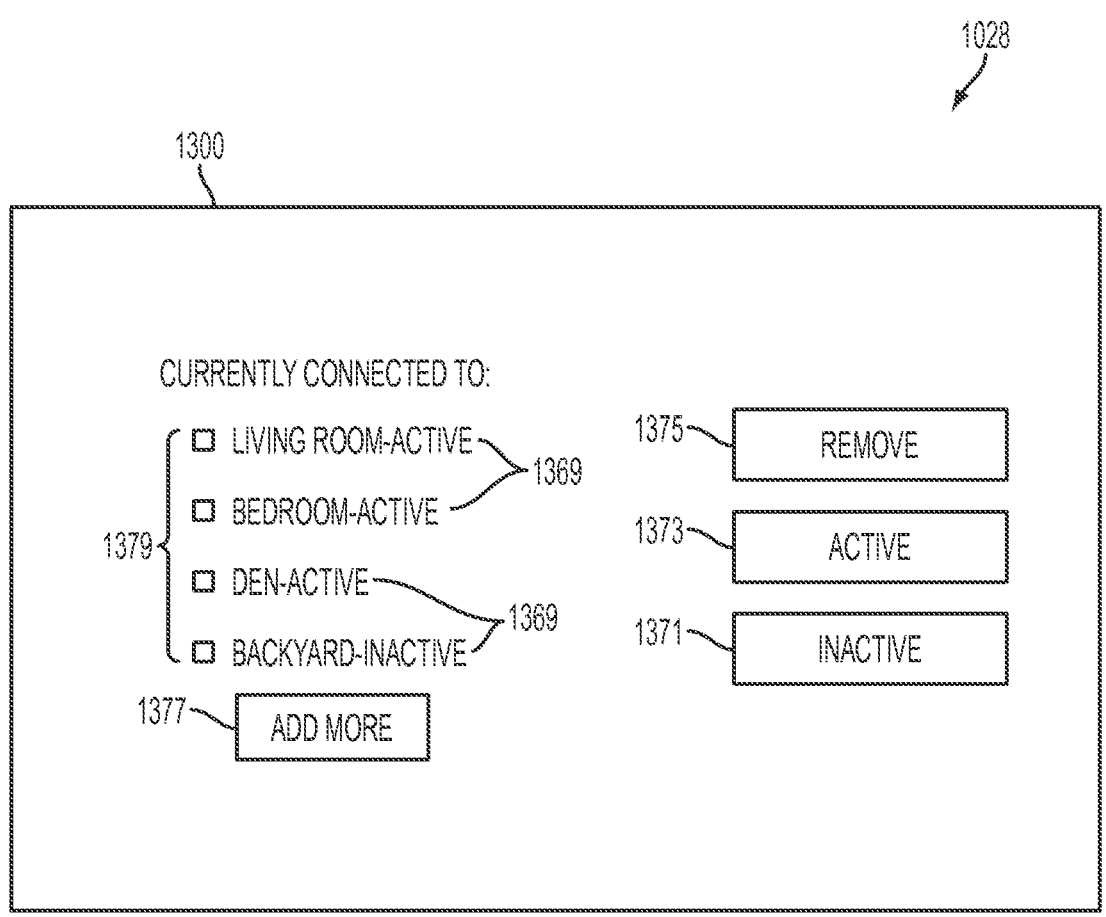
FIG. 13 is a simplified schematic illustration of a user interface of a spatial visual indicator system.

FIG. 13 is a simplified schematic illustration of a user interface 1028 of a spatial visual indicator system 1000 (FIG. 10). The user interface 1028 may be configured to enable a user of the user interface 1028 to designate which spatial visual indicators 1012 the transceiver 1025 should communicate with, and which spatial visual indicators 1028 are active. Referring to FIGS. 10 and 13 together, the user interface 1028 may include a screen display 1300 including a list of unique identifiers 1379, an add unique identifier option 1377, a remove unique identifier option 1375, an active option 1373, and an inactive option 1371.

The list of unique identifiers 1379 may list unique identifiers that each correspond to a spatial visual indicator 1012 that is in communication with the transceiver 1025. If there are no spatial visual indicators 1012 in communication with the transceiver 1025, the list of unique identifiers 1379 may be empty until communication is established between at least one spatial visual indicator 1012 and the transceiver 1025 (e.g., through a wireless pairing).

The unique identifiers in the list 1379 may be configured to enable a user to identify spatial visual indicators 1012 that are in communication with the transceiver 1025. It, therefore, may be desirable to implement the unique identifiers in the list 1379 in a form that is descriptive of the corresponding spatial visual indicators 1012. Of course, in the underlying visual indicator system 1000, the transceiver 1025 may be configured to identify the spatial visual indicators 1012 by other identifiers, such as, for example, IP addresses, MAC addresses, other suitable identifiers, and combinations thereof, that are commonly used to identify devices in networks. Such identifiers, however, usually convey little meaning to most people. Thus, in order to provide a more user-friendly user interface 1028, the unique identifiers in the list 1379 may be descriptive of the corresponding spatial visual indicators 1012.

In some embodiments, the unique identifiers from the list of unique identifiers 1379 may be descriptive of a location of the corresponding spatial visual indicators 1012. By way of non-limiting example, the unique identifiers in the list of unique identifiers 1379 illustrated in FIG. 13 are descriptive of different locations around a user's home, including a "Living Room," a "Bedroom," a "Den," and a "Backyard." Although FIG. 13 illustrates unique identifiers that are descriptive with the use of text descriptions, the present disclosure is not so limited. The unique identifiers 1379 may include illustrations, photographs, icons, other descriptions, and combinations thereof in addition to, or instead of, text descriptions. In some embodiments, the unique identifiers 1379 may not be descriptive of the location of the corresponding spatial visual indicators 1012.

Each unique identifier in the list of unique identifiers 1379 may be accompanied by a status identifier 1369 (also referred to herein in the plurality as "status identifiers 1369"). The status identifiers 1369 may indicate whether the corresponding spatial visual indicators 1012 are active or inactive. The term "active," as used herein with reference to a spatial visual indicator 1012, indicates that the spatial visual indicator 1012 is in a state wherein the spatial visual indicator 1012 may receive communications indicating visual indicator patterns, and display the received visual indicator patterns. The term "inactive," as used herein with reference to a spatial visual indicator 1012, indicates that the spatial visual indicator 1012 is in a state wherein the spatial visual indicator 1012 may receive and relay communications to other spatial visual indicators 1012, but may not display visual indicator patterns, even if the control circuit 1024 detects an event. For example, the control circuit 1024 may cause the transceiver 1025 to send a communication indicating a visual indicator pattern to the spatial visual indicators 1012, but only the spatial visual indicators 1012 that correspond to unique identifiers accompanied by the "active" status identifier 1369 may display the indicated visual indicator pattern. Thus, an inactive spatial visual indicator 1012 may still serve to extend the mesh network 1027 (which may be wired or wireless).

Each unique identifier in the list of unique identifiers 1379 may be selectable by a user of the user interface 1028. In addition, each of the add unique identifier option 1377, the remove unique identifier option 1375, the active option 1373, and the inactive option 1371 may be selectable by the user.

A user may desire to activate a spatial visual indicator 1012 coupled with the control circuit 1024 through the transceiver 1025. The user may select a unique identifier associated with the spatial visual indicator 1012 desired to be made active. Responsive to detecting a user selection of the active option 1373, the control circuit 1024 may cause the status identifier 1369 corresponding to each selected unique identifier to change to "active." In addition, the control circuit 1024 may cause the spatial visual indicator 1012 corresponding to each selected unique identifier to become active.

A user may desire to deactivate a spatial visual indicator 1012 coupled with the control circuit 1024 through the transceiver 1025. The user may select a unique identifier associated with the spatial visual indicator 1012 desired to be made inactive. Responsive to detecting a user selection of the inactive option 1371, the control circuit 1024 may cause the status identifier 1369 corresponding to each selected unique identifier to change to "inactive." In addition, the control circuit 1024 may cause the spatial visual indicator 1012 corresponding to each selected unique identifier to become inactive.

Thus, the user is enabled to designate each of the unique identifiers from the list of unique identifiers as one of active and inactive. Also, the user is enabled to turn on and off certain spatial visual indicators 1012. For example, before the user goes to sleep in the bedroom, the user may change the status identifier 1369 accompanying the unique identifier "bedroom" to "inactive" so that a visual indicator pattern displayed by the spatial visual indicator in the bedroom may not interrupt the user's sleep. After the user is finished sleeping, the user may change the status identifier 1369 accompanying the unique identifier "bedroom" to "active."

Removing unique identifiers using the remove unique identifier option 1375 will be discussed with reference to FIGS. 14A, 14B. Adding unique identifiers using the add unique identifier option 1377 will be discussed with reference to FIGS. 15A and 15B.

Figure 14A:
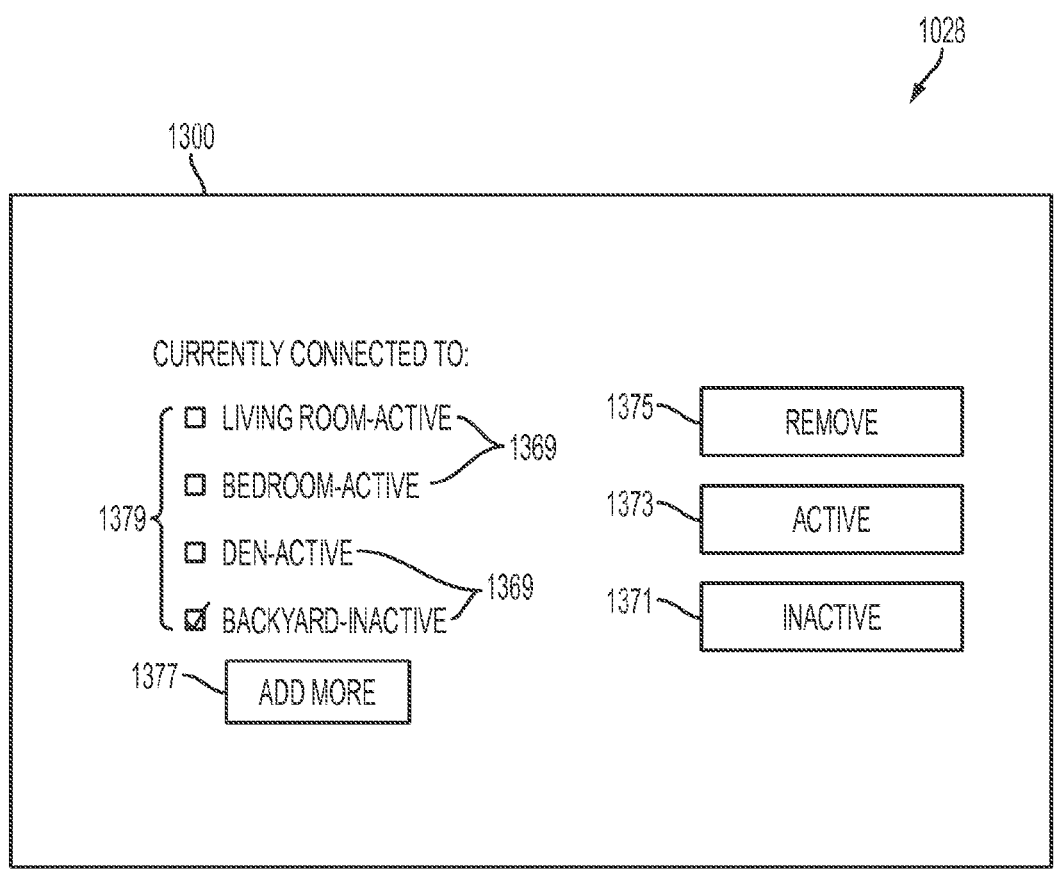
FIGS. 14A and 14B illustrate an exemplary user interaction with the user interface of FIG. 13.
Figure 14B:
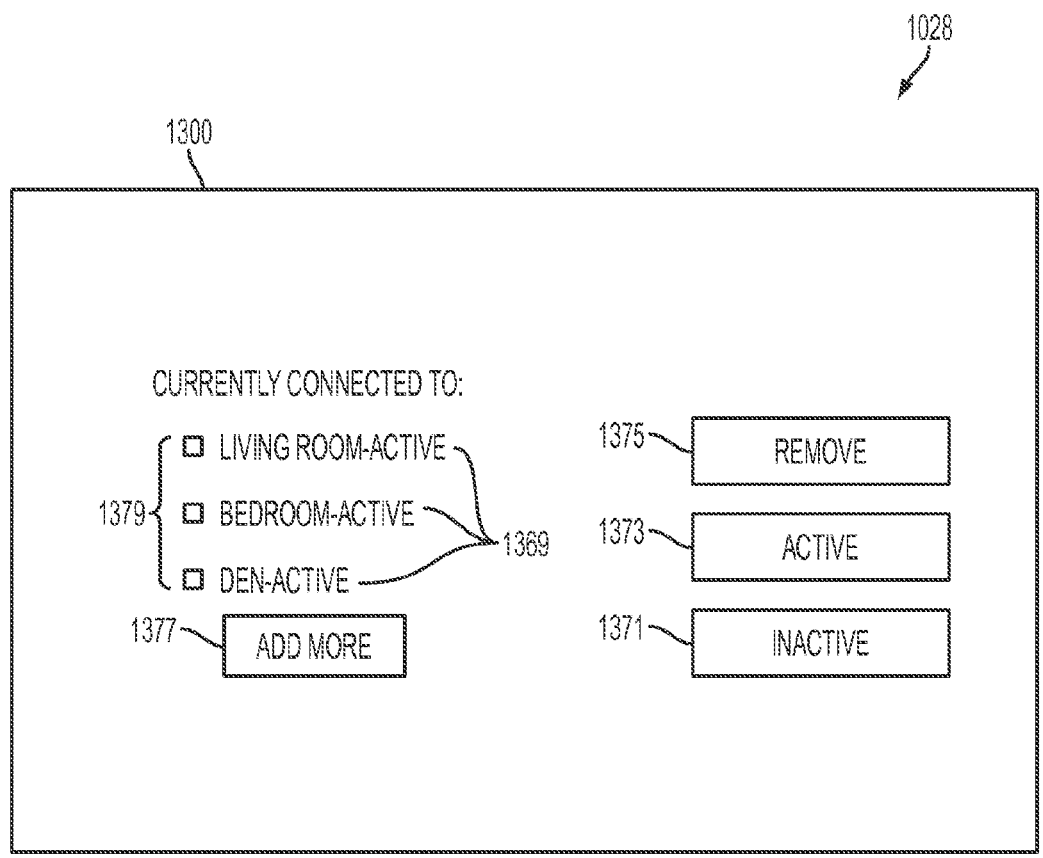

FIGS. 14A and 14B illustrate an exemplary user interaction with the user interface 1028 of FIG. 13 to remove a unique identifier from the list of unique identifiers 1379. For the most part, the elements of FIGS. 14A and 14B are the same as those of FIG. 13. As a result, there is no need to describe the similar elements again and the discussions of FIGS. 14A and 14B will concentrate on the differences in FIGS. 14A and 14B. The user may select a unique identifier from the list of unique identifiers 1379. By way of non-limiting example, the user may select the unique identifier "backyard," corresponding to a spatial visual indicator 1012 located in the backyard as shown in FIG. 14A. The user may then select the remove unique identifier option 1375. As a result, the control circuit 1024 may cause each selected unique identifier to be removed from the list of unique identifiers 1379 responsive to detecting the selection of the remove unique identifier option 1375. As a result, the "backyard" unique identifier may be removed from the list of unique identifiers 1379 as shown in FIG. 14B. In addition to removing the selected unique identifier from the list of unique identifiers 1379, the control circuit 1024 may further cause the transceiver 1025 to terminate communication with the spatial visual indicators 1012 that correspond to the selected unique identifiers. Thus, spatial visual indicators 1012 corresponding to the removed unique identifiers may not receive communications from the transceiver 1025, or relay communications to other spatial visual indicators 1012. For example, if the "backyard" unique identifier is removed from the list of unique identifiers 1379, the control circuit 1024 may also cause the transceiver 1025 to terminate communication with the spatial visual indicator 1012 in the backyard. As a result, the user is enabled to remove unique identifiers from the list of unique identifiers 1379, and the control circuit 1024 may cause the transceiver 1025 to terminate communication with the corresponding spatial visual indicators 1012.

Termination of communication with a particular spatial visual indicator 1012 may be temporary in nature. For example, the user may desire to enable communication again with the removed spatial visual indicator 1012. Thus, the user may select the add more unique identifiers option 1377 and again add the "backyard" unique identifier to resume communication with the spatial visual indicator 1012 located in the backyard. Adding unique identifiers will be further described with respect to FIGS. 15A and 15B.

Figure 15A:
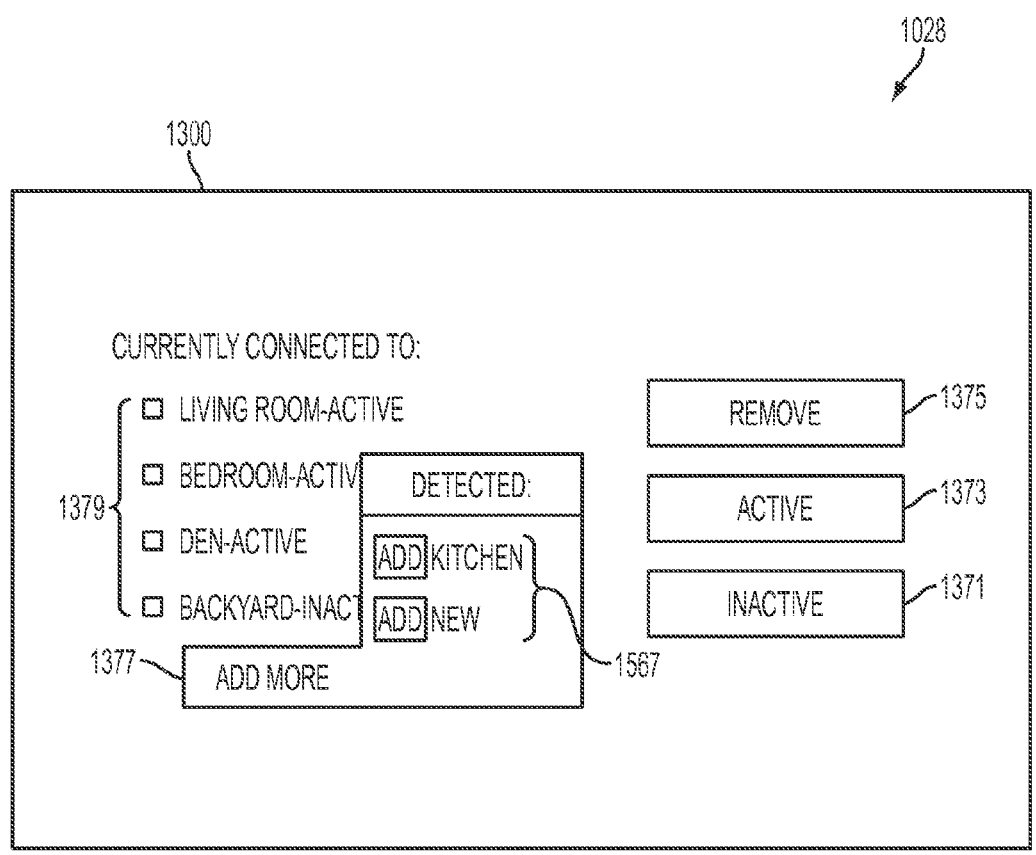
FIGS. 15A and 15B illustrate another exemplary user interaction with the user interface of FIG. 13.
Figure 15B:
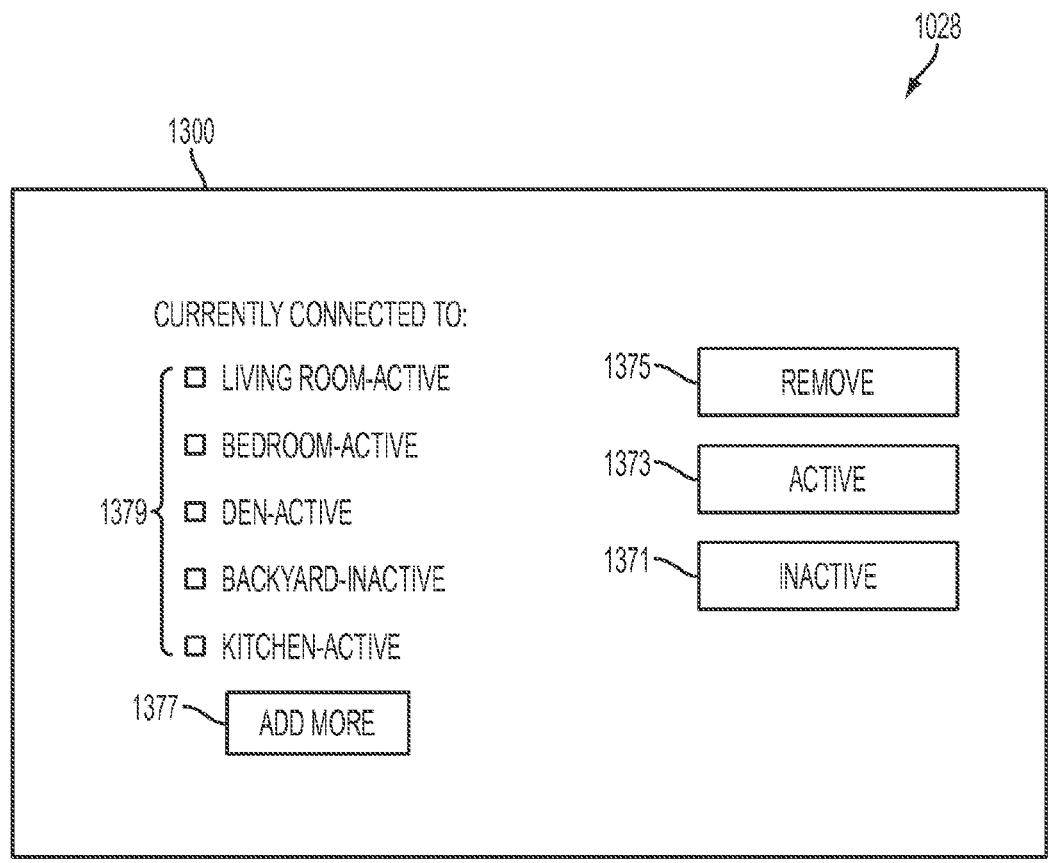

FIGS. 15A and 15B illustrate another exemplary user interaction with the user interface of FIG. 13. For the most part, the elements of FIGS. 15A and 15B are the same as those of FIG. 13. As a result, there is no need to describe the similar elements again and the discussions of FIGS. 15A and 15B will concentrate on the differences in FIGS. 15A and 15B. The add unique identifier option 1377 may be selectable by the user of the user interface 1028. Responsive to detecting a selection of the add unique identifier option 1377, the control circuit 1024 may determine whether there are any detected spatial visual indicators 1012 that do not presently correspond to a unique identifier from the list of unique identifiers 1379. By way of non-limiting example, the control circuit 1024 may receive IP addresses through the transceiver 1025 that correspond to new or previously removed spatial visual indicators 1012.

If the user selects the add unique identifier option 1377, the control circuit 1024 may cause the user interface 1028 to present a list 1567 of unique identifiers corresponding to the detected spatial visual indicators 1012. For example, FIG. 15A illustrates the user interface 1028 presenting the list 1567 of the unique identifiers corresponding to the detected spatial visual indicators 1012, namely "kitchen," and "new."

The unique identifiers in the list 1567 may be default unique identifiers if the transceiver 1025 has not previously established communication with the corresponding spatial visual indicators 1012. For example, "new" may be a default unique identifier. The unique identifiers in the list 1567 may be previously used unique identifiers if the transceiver 1025 has previously established communication with the corresponding spatial visual indicators 1012. For example, "kitchen" may correspond to a spatial visual indicator 1012 that was previously in communication with the transceiver 1025 while the spatial visual indicator 1012 was located in the kitchen. In some embodiments, the control circuit 1024 may be configured to cause the storage device 1026 to store a unique identifier that corresponded to a spatial visual indicator 1012 with which communication was previously established. By way of non-limiting example, the control circuit 1024 may recognize an IP address of a spatial visual indicator 1012, and cause the corresponding previous unique identifier stored in the storage device 1026 to be displayed in the list 1567. In some embodiments, the spatial visual indicator 1012 may be configured to store the unique identifier. By way of non-limiting example, the spatial visual indicator 1012 may send the unique identifier to the control circuit 1024 through the transceiver 1025, and the control circuit 1024 may cause the unique identifier to be displayed in the list 1567.

The control circuit 1024 may be configured to enable the user to edit the unique identifiers in the list 1567. In some embodiments, each unique identifier in the list 1567 may comprise a text field that is configured to be selected and edited by the user. By way of non-limiting example, the user may change the "new" unique identifier to a unique identifier that is descriptive of the location of the corresponding spatial visual indicator 1012. Also by way of non-limiting example, the user may change the "kitchen" unique identifier to a unique identifier that is descriptive of a changed location of the corresponding spatial visual indicator.

Each of the unique identifiers from the list 1567 may be selectable by the user. Responsive to a detection of a user selection of a unique identifier from the list 1567, the control circuit 1024 may cause the user interface 1028 to display the selected unique identifier in the list of unique identifiers 1379. The control circuit 1024 may also cause the transceiver 1025 to establish communication with the corresponding spatial visual indicator 1012. By way of non-limiting example, the control circuit 1024 may detect a user selection of the "kitchen" unique identifier in the list 1567, as illustrated in FIG. 15A. In response, the control circuit 1024 may cause the unique identifier "kitchen" to be presented in the list of unique identifiers 1379, as illustrated in FIG. 15B. The control circuit 1024 may also cause the transceiver 1025 to establish communication with the spatial visual indicator 1012 corresponding to the "kitchen" unique identifier.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodi-

What is claimed is:

1. A spatial visual indicator system, comprising:
a spatial visual indicator comprising a plurality of discrete illuminatable elements configured in at least a two-dimensional geometrical arrangement, the spatial visual indicator configured to:
communicate with a transceiver located remotely from the spatial visual indicator, wherein the transceiver corresponds to a communication device configured to assist a hearing-impaired user in communicating with a far end user; and
display a first visual indicator pattern corresponding to a first event responsive to receiving a communication from the transceiver indicating the first visual indicator pattern.

2. The spatial visual indicator system of claim 1, further comprising another spatial visual indicator located remotely from the spatial visual indicator and the transceiver, the another spatial visual indicator comprising another plurality of discrete illuminatable elements configured in at least a two-dimensional geometrical pattern, the another spatial visual indicator configured to:
communicate with the transceiver; and
display the first visual indicator pattern corresponding to the first event responsive to receiving the communication from the transceiver indicating occurrence of the first event.

3. The spatial visual indicator system of claim 2, wherein the spatial visual indicator and the another spatial visual indicator are each configured to relay communications from the transceiver to each other.

4. The spatial visual indicator system of claim 3, wherein the spatial visual indicator, the another spatial visual indicator, and the transceiver are configured to communicate with each other according to an Ad-hoc On-demand Distance Vector Routing (AODV) protocol.

5. The spatial visual indicator system of claim 1, wherein the spatial visual indicator is configured as a visual caller identification device configured to indicate a source of an incoming call.

6. A method of indicating an occurrence of an event, the method comprising:
receiving, with at least one spatial visual indicator, a communication from a transceiver corresponding to a communication device for hearing-impaired users located remotely to the at least one spatial visual indicator, the communication indicating a visual indicator pattern that is associated with a detected event; and
displaying the visual indicator pattern with a plurality of discrete illuminatable elements configured in at least a two-dimensional geometrical arrangement on the at least one spatial visual indicator.

7. The method of claim 6, wherein receiving the communication from the transceiver comprises the communication being routed by at least another spatial visual indicator in a mesh network of spatial visual indicators including the at least one spatial visual indicator and the another spatial visual indicator.

8. The method of claim 6, wherein receiving, with at least one spatial visual indicator, the communication from the transceiver comprises receiving the communication with a plurality of spatial visual indicators.

9. A method of indicating an occurrence of an event, the method comprising:
detecting an occurrence of an event with a control circuit corresponding to a video communication device configured to assist a hearing-impaired user in communicating with a far-end user; and
transmitting, with a transceiver corresponding to the video communication device, a communication to one or more spatial visual indicators located remotely to the transceiver, the communication indicating a visual indicator pattern that is associated with the detected event, the one or more spatial visual indicators each comprising a plurality of discrete illuminatable elements configured in at least a two-dimensional geometrical arrangement for displaying the visual indicator pattern.

10. The method of claim 9, further comprising causing a user interface operably coupled to the control circuit to indicate the one or more spatial visual indicators to a user of the user interface.

11. The method of claim 10, further comprising:
establishing communication between the transceiver and an additional spatial visual indicator responsive to the user interacting with the user interface; and
transmitting the communication to the additional spatial visual indicator.

12. The method of claim 11, wherein establishing communication between the transceiver and an additional spatial visual indicator responsive to the user interacting with the user interface comprises:
presenting, on the user interface, one or more detected spatial visual indicators detected by the transceiver; and
enabling the user of the user interface to select one or more of the one or more detected spatial visual indicators.

13. The method of claim 10, wherein causing the user interface to indicate the one or more spatial visual indicators comprises displaying a list of unique identifiers that are descriptive of locations of the corresponding one or more spatial visual indicators.

14. The method of claim 10, further comprising:
terminating communication between the transceiver and a spatial visual indicator from the one or more spatial visual indicators responsive to the user interacting with the user interface.

15. The method of claim 10, further comprising designating each of the one or more spatial visual indicators as one of active and inactive responsive to the user interacting with the user interface, wherein both active and inactive ones of the one or more spatial visual indicators are configured to route communications from the transceiver to each other, but only the active ones of the one or more spatial visual indicators are configured to display the visual indicator pattern.

16. A spatial visual indicator system, comprising:
a control circuit corresponding to a communication device configured to assist a hearing-impaired user in communicating with far-end users, the control circuit configured to detect an occurrence of an event corresponding to a visual indicator pattern to be displayed by a plurality of discrete illuminatable elements arranged in at least a two-dimensional geometrical configuration; and
a transceiver operably coupled to the control circuit, the transceiver configured to send a communication indicating the visual indicator pattern corresponding to the detected event to at least one spatial visual indicator that is configured to display the visual indicator pattern, and that is located remotely to the transceiver.

17. The spatial visual indicator system of claim 16, further comprising the communication device, wherein the communication device is configured to receive an incoming call from one or more other communication devices, the communication device comprising the control circuit.

18. The spatial visual indicator system of claim 17, wherein the communication device includes at least one of a video phone and a text captioned communication device.

19. The spatial visual indicator system of claim 17, wherein the event includes at least one event selected from the group consisting of:
- an incoming call to the communication device from a particular one of the one or more other communication devices;
- receipt of a voicemail message;
- receipt of a text message;
- receipt of a video message;
- availability of a software update;
- a system error; and
- a detection of an additional spatial visual indicator that was not previously in communication with the transceiver.

20. The spatial visual indicator system of claim 16, further comprising a computer-readable medium operably coupled to the control circuit and configured to store computer-readable instructions, wherein the control circuit is at least partially implemented as a processing circuit configured to execute the computer-readable instructions.

21. A spatial visual indicator system associated with a video communication device configured to assist hearing-impaired users in communicating with users of other communication devices, the spatial visual indicator system comprising:
- a plurality of spatial visual indicators, each spatial visual indicator thereof including a plurality of discrete illuminatable elements arranged in at least a two-dimensional geometrical arrangement;
- a video communication device configured to assist hearing-impaired users in communicating with users of other communication devices over a communication network;
- a storage device corresponding to the video communication device and configured to store data corresponding to visual indicator patterns associated with some of the other communication devices;
- a communication transceiver corresponding to the video communication device and configured to communicate with each spatial visual indicator of the plurality of spatial visual indicators; and
- a control circuit corresponding to the video communication device and operably coupled with the storage device and the communication transceiver, the control circuit configured to:
- identify a source of an incoming video call received by the video communication device; and
- direct the plurality of spatial visual indicators, through the communication transceiver, to display a visual indicator pattern corresponding to one of the other communication devices responsive to identifying the one of the other communication devices as the source of the incoming video call.

22. The spatial visual indicator system of claim 21, wherein each visual spatial indicator of the plurality of spatial visual indicators is configured to relay communications from the transceiver to others of the plurality of spatial visual indicators.

23. The spatial visual indicator system of claim 21, wherein the plurality of spatial visual indicators are operably coupled together in a mesh network.

24. The spatial visual indicator system of claim 22, wherein the plurality of spatial visual indicators are operably coupled together in a fully connected network such that each spatial visual indicator is configured to relay communications to all others of the plurality of spatial visual indicators.

25. The spatial visual indicator system of claim 21, wherein the video communication device includes the storage device, the communication transceiver, and the control circuit.

26. The spatial visual indicator system of claim 21, wherein the plurality of discrete illuminatable elements of at least one of the plurality of spatial visual indicators include a plurality of discrete shapes displayed on an electronic display and arranged in a two-dimensional geometrical arrangement.

* * * * *